（12）United States Patent
Midgley et al.

(10) Patent No.: US 7,860,832 B2
(45) Date of Patent: *Dec. 28, 2010

(54) SYSTEMS AND METHODS FOR MAINTAINING DATA FILES

(75) Inventors: Christopher Midgley, Northborough, MA (US); John Webb, Sutton, MA (US)

(73) Assignee: Iron Mountain Incorporated, Boston, MA (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/754,785

(22) Filed: May 29, 2007

(65) Prior Publication Data

US 2007/0294321 A1    Dec. 20, 2007

Related U.S. Application Data

(63) Continuation of application No. 10/675,399, filed on Sep. 30, 2003, now Pat. No. 7,225,208.

(51) Int. Cl.
G06F 7/00 (2006.01)
G06F 17/00 (2006.01)

(52) U.S. Cl. ...................... 707/634; 707/638
(58) Field of Classification Search ................ None
See application file for complete search history.

(56) References Cited

U.S. PATENT DOCUMENTS

| | | | |
|---|---|---|---|
| 4,432,057 A | 2/1984 | Daniell et al. | |
| 4,558,413 A | 12/1985 | Schmidt et al. | |
| 4,751,635 A | 6/1988 | Kret | |
| 5,043,871 A | 8/1991 | Nishigaki et al. | |
| 5,276,860 A | 1/1994 | Fortier et al. | |
| 5,493,728 A | 2/1996 | Solton et al. | |
| 5,572,709 A | 11/1996 | Fowler et al. | |
| 5,574,898 A | 11/1996 | Leblang et al. | |
| 5,577,244 A | 11/1996 | Killebrew et al. | |
| 5,604,900 A | 2/1997 | Iwamoto et al. | |

(Continued)

FOREIGN PATENT DOCUMENTS

WO    WO 98/54662    12/1998

OTHER PUBLICATIONS

Wolfson, Ouri et al., "Distributed Algorithms for Dynamic Replication of Data", 11th Principles of Database Systems, ACM, Jun. 1992, pp. 149-163.

(Continued)

*Primary Examiner*—Uyen T. Le
(74) *Attorney, Agent, or Firm*—Finnegan, Henderson, Farabow, Garrett & Dunner LLP

(57) ABSTRACT

In a storage system having a source storage system and target storage system, systems and methods maintain information from which a set of source data files stored on a storage system can be retrieved. In one embodiment, baseline images of one or more source data files are stored in target files of the target storage system. For a selected target storage time, locations in the source storage system where changes have been made since a previous target storage time are dynamically identified. Contents that occupy the locations are read and sent to the target storage system. The contents are stored in the target storage system together with associations of the contents with the locations.

51 Claims, 7 Drawing Sheets

U.S. PATENT DOCUMENTS

| | | | |
|---|---|---|---|
| 5,649,200 A | 7/1997 | Leblang et al. | |
| 5,675,802 A | 10/1997 | Allen et al. | |
| 5,689,706 A | 11/1997 | Rao et al. | |
| 5,737,536 A | 4/1998 | Herrmann et al. | |
| 5,745,753 A | 4/1998 | Mosher, Jr. | |
| 5,751,958 A | 5/1998 | Zweben et al. | |
| 5,752,042 A | 5/1998 | Cole et al. | |
| 5,754,782 A | 5/1998 | Masada | |
| 5,758,355 A | 5/1998 | Buchanan | |
| 5,758,359 A | 5/1998 | Saxon | |
| 5,764,972 A | 6/1998 | Crouse et al. | |
| 5,765,171 A | 6/1998 | Gehani et al. | |
| 5,778,395 A | 7/1998 | Whiting et al. | |
| 5,794,563 A | 8/1998 | Klepac | |
| 5,835,953 A | 11/1998 | Ohran | |
| 5,845,273 A * | 12/1998 | Jindal | 707/1 |
| 5,854,754 A | 12/1998 | Cabrera et al. | |
| 5,907,848 A | 5/1999 | Zaiken et al. | |
| 5,909,689 A | 6/1999 | Van Ryzin | |
| 5,920,701 A | 7/1999 | Miller et al. | |
| 5,920,873 A | 7/1999 | Van Huben et al. | |
| 5,931,947 A | 8/1999 | Burns et al. | |
| 5,946,700 A | 8/1999 | Pongracz et al. | |
| 5,974,563 A | 10/1999 | Beeler, Jr. | |
| 5,978,805 A | 11/1999 | Carson | |
| 5,991,772 A | 11/1999 | Doherty et al. | |
| 5,999,930 A | 12/1999 | Wolff | |
| 5,999,947 A | 12/1999 | Zollinger et al. | |
| 6,000,020 A | 12/1999 | Chin et al. | |
| 6,023,709 A | 2/2000 | Anglin et al. | |
| 6,023,710 A | 2/2000 | Steiner et al. | |
| 6,038,665 A | 3/2000 | Bolt et al. | |
| 6,044,367 A | 3/2000 | Wolff | |
| 6,052,695 A | 4/2000 | Abe et al. | |
| 6,067,541 A | 5/2000 | Raju et al. | |
| 6,085,241 A | 7/2000 | Otis | |
| 6,088,694 A | 7/2000 | Burns et al. | |
| 6,088,706 A | 7/2000 | Hild | |
| 6,094,654 A | 7/2000 | Van Huben et al. | |
| 6,122,663 A * | 9/2000 | Lin et al. | 709/224 |
| 6,173,377 B1 | 1/2001 | Yanai et al. | |
| 6,185,601 B1 | 2/2001 | Wolff | |
| 6,189,016 B1 | 2/2001 | Cabrera et al. | |
| 6,199,073 B1 | 3/2001 | Peairs et al. | |
| 6,199,074 B1 | 3/2001 | Kern et al. | |
| 6,212,529 B1 | 4/2001 | Boothby et al. | |
| 6,216,051 B1 | 4/2001 | Hager, III et al. | |
| 6,233,589 B1 | 5/2001 | Balcha et al. | |
| 6,240,527 B1 | 5/2001 | Schneider et al. | |
| 6,260,069 B1 | 7/2001 | Anglin | |
| 6,269,381 B1 | 7/2001 | St. Pierre et al. | |
| 6,269,431 B1 | 7/2001 | Dunham | |
| 6,324,544 B1 | 11/2001 | Alam et al. | |
| 6,353,878 B1 | 3/2002 | Dunham | |
| 6,397,307 B2 | 5/2002 | Ohran | |
| 6,405,219 B2 | 6/2002 | Saether et al. | |
| 6,460,055 B1 | 10/2002 | Midgley et al. | |
| 6,470,287 B1 | 10/2002 | Smartt | |
| 6,513,051 B1 | 1/2003 | Bolosky et al. | |
| 6,526,418 B1 | 2/2003 | Midgley et al. | |
| 6,532,588 B1 | 3/2003 | Porter | |
| 6,546,404 B1 | 4/2003 | Davis et al. | |
| 6,560,615 B1 | 5/2003 | Zayas et al. | |
| 6,625,623 B1 | 9/2003 | Midgley et al. | |
| 6,675,177 B1 | 1/2004 | Webb | |
| 6,704,755 B2 | 3/2004 | Midgley et al. | |
| 6,728,736 B2 | 4/2004 | Hostetter et al. | |
| 6,779,003 B1 | 8/2004 | Midgley et al. | |
| 6,847,984 B1 | 1/2005 | Midgley et al. | |
| 2001/0044910 A1 | 11/2001 | Ricart et al. | |
| 2002/0091779 A1 | 7/2002 | Donoho et al. | |
| 2003/0074378 A1 | 4/2003 | Midgley et al. | |
| 2003/0101321 A1 | 5/2003 | Ohran | |
| 2003/0191737 A1 | 10/2003 | Steele et al. | |
| 2005/0193031 A1 | 9/2005 | Midgley et al. | |
| 2007/0208783 A1 | 9/2007 | Midgley et al. | |

OTHER PUBLICATIONS

Boutaba, Raouf et al., "A Generic Platform for Scalable Access to Multimedia-on-Demand Systems", IEEE Journal on Selected Areas in Communications, vol. 17, No. 9, Sep. 1999, pp. 1599-1613.
Huang, Yixiu et al., "A Competitive Dynamic Data Replication Algorithm", Proceedings of the $9^{th}$ International Conference on Data Engineering, Apr. 19-23, 1993, pp. 310-317.
Mohan et al., "ARIES/CSA: A Method for Database Recovery in Client-Server Architecture", ACM, 1994, pp. 55-66.
Office Action dated Jan. 25, 2002, from U.S. Appl. No. 09/465,411.
Final Office Action dated Jul. 17, 2002, from U.S. Appl. No. 09/465,411.
Advisory Action dated Sep. 20, 2002, from U.S. Appl. No. 09/465,411.
Notice of Allowance dated Nov. 19, 2002, from U.S. Appl. No. 09/465,411.
Office Action dated Mar. 24, 2004, from U.S. Appl. No. 10/320,762.
Notice of Allowance dated Dec. 2, 2004, from U.S. Appl. No. 10/320,762.
Office Action dated May 25, 2005, from U.S. Appl. No. 10/320,762.
Notice of Allowance dated Sep. 27, 2005, from U.S. Appl. No. 10/320,762.
Notice of Allowance dated Nov. 17, 2005, from U.S. Appl. No. 10/320,762.
Office Action dated May 19, 2006, from U.S. Appl. No. 10/320,762.
Final Office Action dated Nov. 3, 2006, from U.S. Appl. No. 10/320,762.
Office Action dated May 22, 2006, from U.S. Appl. No. 11/084,270.
Office Action dated Jun. 17, 2009 from U.S. Appl. No. 11/743,875.
Notice of Allowance dated Oct. 30, 2009, from U.S. Appl. No. 11/743,875.
Office Action dated May 17, 2002, from U.S. Appl. No. 09/465,408.
Office Action dated Nov. 20, 2002, from U.S. Appl. No. 09/465,408.
Notice of Allowance dated Apr. 8, 2003, from U.S. Appl. No. 09/465,408.
Office Action dated Mar. 25, 2002, from U.S. Appl. No. 09/465,435.
Final Office Action dated Jul. 11, 2002, from U.S. Appl. No. 09/465,435.
Advisory Action dated Sep. 27, 2002, from U.S. Appl. No. 09/465,435.
Office Action dated Dec. 24, 2002, from U.S. Appl. No. 09/465,435.
Final Office Action dated Jul. 23, 2003, from U.S. Appl. No. 09/465,435.
Advisory Action dated Oct. 22, 2003, from U.S. Appl. No. 09/465,435.
Notice of Allowance dated Feb. 20, 2004, from U.S. Appl. No. 09/465,435.
Office Action dated Jan. 28, 2002, from U.S. Appl. No. 09/465,436.
Final Office Action dated Jul. 17, 2002, from U.S. Appl. No. 09/465,436.
Advisory Action dated Oct. 2, 2002, from U.S. Appl. No. 09/465,436.
Office Action dated Jan. 30, 2003, from U.S. Appl. No. 09/465,436.
Final Office Action dated Aug. 13, 2003, from U.S. Appl. No. 09/465,436.
Advisory Action dated Sep. 26, 2003, from U.S. Appl. No. 09/465,436.
Office Action dated Jul. 27, 2004, from U.S. Appl. No. 09/465,436.
Notice of Allowance dated Sep. 24, 2004, from U.S. Appl. No. 09/465,436.
Office Action dated Feb. 26, 2003, from U.S. Appl. No. 10/152,060.
Final Office Action dated Aug. 13, 2003, from U.S. Appl. No. 10/152,060.
Notice of Allowance dated Oct. 14, 2003, from U.S. Appl. No. 10/152,060.
Office Action dated Oct. 3, 2005, from U.S. Appl. No. 10/675,399.

Final Office Action dated Apr. 21, 2006, from U.S. Appl. No. 10/675,399.
Advisory Action dated Jul. 12, 2006, from U.S. Appl. No. 10/675,399.
Office Action dated Sep. 7, 2006, from U.S. Appl. No. 10/675,399.
Notice of Allowance dated Feb. 22, 2007, from U.S. Appl. No. 10/675,399.
Notice of Allowance dated Apr. 18, 2002, from U.S. Appl. No. 09/465,485.
European Search Report dated Mar. 15, 2005, from EP App. No. 04023076.5.
PCT Search Report dated Oct. 25, 2005, from PCT Application No. PCT/US2004/030221.

* cited by examiner

SYSTEMS AND METHODS FOR MAINTAINING DATA FILES

REFERENCE TO RELATED APPLICATIONS

This application is a continuation application under 37 C.F.R. §1.53(b) of prior application Ser. No. 10/675,399, filed Sep. 30, 2003 now U.S. Pat. No. 7,225,208 of Christopher MIDGLEY et al., for SYSTEMS AND METHODS FOR BACKING UP DATA FILES. This Application is also related to U.S. patent application Ser. No. 09/465,408 (now U.S. Pat. No. 6,625,623), Ser. No. 09/465,411 (now U.S. Pat. No. 6,526,418), Ser. No. 09/465,435 (now U.S. Pat. No. 6,779,003), Ser. No. 09/465,436 (now U.S. Pat. No. 6,847,984), Ser. No. 09/465,485 (now U.S. Pat. No. 6,460,055), Ser. No. 10/152,060 (now U.S. Pat. No. 6,704,755), and Ser. No. 11/743,875 now U.S. Pat. No. 7,644,113, which is a continuation of U.S. patent application Ser. No. 10/320,762 (abandoned), the contents of which applications are expressly incorporated by reference herein in their entireties.

BACKGROUND

Some back up systems operate by having the network administrator identify a time of day during which little or no network activity occurs. During this time, a network administrator can allow a backup system and the data files stored on the computer network to be backed-up, file by file, to a long term storage medium, such as a tape backup system. Typically the network administrator will back up once a week, or even once a day, to ensure that the back up files are current. Such a backup process can be a time consuming, labor intensive, and cumbersome. As computer networks generally operate twenty-four hours a day, seven days week, it can be difficult for a system/network administrator to identify a time period during which network resources may be relegated to a back up procedure. Further, increased users and numbers of changes on a regular daily basis diminishes the value of a back up system that operates once a week or once a day. Systems that only generate back up data periodically are thus of a reduced value.

In some alternate systems, a data server and a backup server can maintain mirrored data files and backup files. For example, in one such system, a data server can execute change requests on data files and transmit the change requests to the backup server, and the backup server can execute the change requests on the corresponding backup files to keep the backup files mirrored to the data files. Such systems may be viewed as lacking efficiency in their use of data processing capacity and data storage capacity, as two copies of all files are generally required.

SUMMARY

Methods for backing up data files are described. In one embodiment, the methods can include detecting changed locations in one or more data files, storing the contents of the changed locations at a storage time, and associating the stored contents with the storage time, the changed locations, and one or more file identifiers identifying the one or more data files.

The storage time can be based on an actual time, a time interval, and/or an event.

In one embodiment, the methods can further include generating a baseline image prior to detecting the changed locations. The baseline image can include one or more of the data files and can be based on a snapshot image, a file image, and/or a volume image.

Detecting changed locations in the data files can include using one or more data integrity procedures to generate a summary of an image of the data files. The data integrity procedures can include a cyclic redundancy check (CRC) procedure and/or an MD5 message digest procedure.

Detecting changed locations in the data files can include generating a baseline image of the data files and using a data integrity procedure to generate a summary of the baseline image at a time prior to the storage time, generating a second image of the data files and using the data integrity procedure to generate a summary of the second image thereafter, and determining whether the data files include changed locations based on the baseline summary and the second summary.

Detecting changed locations can include dynamically detecting the changed locations.

Storing the contents can include selecting at least one memory to store the contents. The memory can be distinct from a previously selected memory associated with a prior storage time.

For the described systems and methods, associating can include generating one or more indexes to associate the stored contents, the respective storage times, the respective changed locations, and the respective file identifiers. The indexes can include a first index to the changed locations based on the file identifiers and a second index to the stored contents based on the changed locations.

In one embodiment, the method can further include iteratively returning to detecting changed locations.

In one embodiment, the method can further include using the stored contents to create a version of a selected one of the data files.

For the described systems and methods, using the stored contents to create a version of a selected data file can include querying the indexes to identify stored contents and respective changed locations associated with the selected data file and combining the identified stored contents with data from a baseline image associated with the selected data file. The indexes can be queried for each of the storage times associated with the version based on the file identifier associated with the selected data file.

Querying the indexes can include determining that the changed locations are the same for two or more different storage times and identifying the stored contents of the changed locations associated with the latest of the different storage times.

In one embodiment, the methods can further include coalescing data.

Coalescing data can include coalescing: two or more stored contents associated with the same file identifier and two or more different storage times, the respective changed locations associated with the two or more coalesced contents, and the indexes to associate the coalesced contents, the respective coalesced changed locations, the file identifier, and the latest of the different storage times.

Coalescing data can also include coalescing: two or more stored contents associated with the same file identifier and the same storage time, the respective changed locations associated with the two or more coalesced contents, and the indexes to associate the coalesced contents, the respective coalesced changed locations, the file identifier, and the same storage time.

Also described are processor programs for backing up data files. The processor programs can be stored on a processor-readable medium. In one embodiment, the processor programs can include instructions to cause a processor to: detect changed locations in one or more data files, store the contents of the changed locations at a storage time, and associate the stored contents with the storage time, the changed locations, and one or more file identifiers identifying the one or more data files.

Also described are systems for backing up data files. In one embodiment, the systems can include one or more data files, one or more servers in communication with the data files, where one or more of the servers can be configured to execute change requests on the data files, and one or more agents in communication with the one or more servers, where the one or more agents can be configured to: detect changed locations in the one or more data files, store the contents of the changed locations at a storage time, and associate the stored contents with the storage time, the changed locations, and one or more file identifiers identifying the one or more files.

These and other features of the described systems and methods can be more fully understood by referring to the following detailed description and accompanying drawings.

DETAILED DESCRIPTION

Figure 1A:
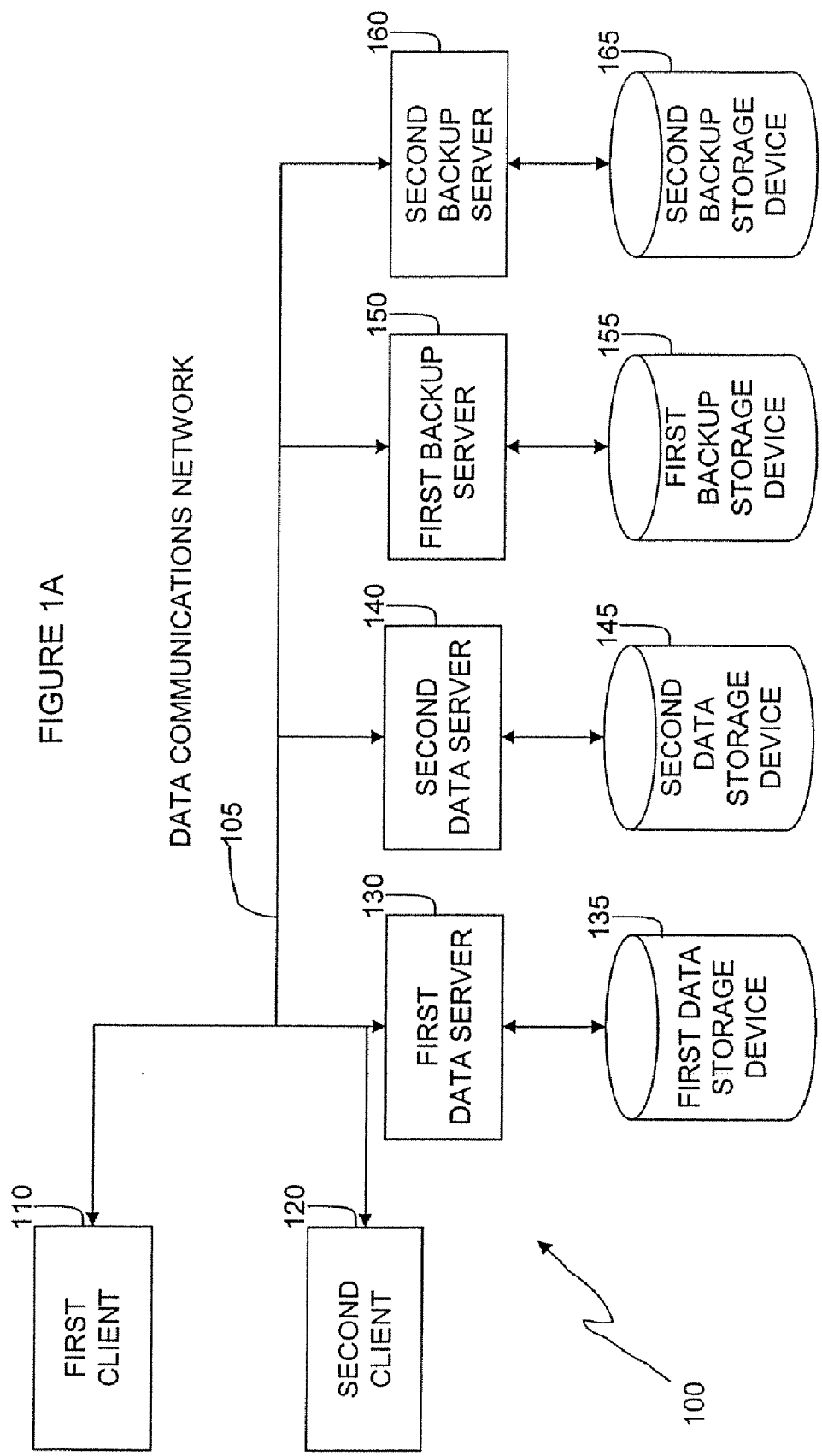
FIGS. 1A-1C schematically illustrate an exemplary system for backing up data files.

Illustrative embodiments will now be described to provide an overall understanding of the systems and methods described herein. One or more examples of the illustrative embodiments are shown in the drawings. Those of ordinary skill in the art will understand that the systems and methods described herein can be adapted and modified to provide devices, methods, schemes, and systems for other applications, and that other additions and modifications can be made to the systems and methods described herein without departing from the scope of the present disclosure. For example, aspects, components, features, and/or modules of the illustrative embodiments can be combined, separated, interchanged, and/or rearranged to generate other embodiments. Such modifications and variations are included within the scope of the present disclosure.

Generally, the described systems and methods relate to backing up data files. In embodiments of the described systems and methods, one or more agents can detect changed locations in one or more data files with respect to an image of the data files. The agents can store the contents of the changed locations at a storage time and can generate one or more indexes to associate the stored contents with the storage time, the changed locations, and one or more file identifiers identifying the data files associated with the changed locations. The agents can thus iteratively return to detecting and/or continue to detect changed locations in the data files with respect to the image, at respective times. Based on the image, the stored contents, and the indexes, the agents can recreate one or more versions of one or more of the data files including changed locations at one or more of the storage times.

Figure 1B:
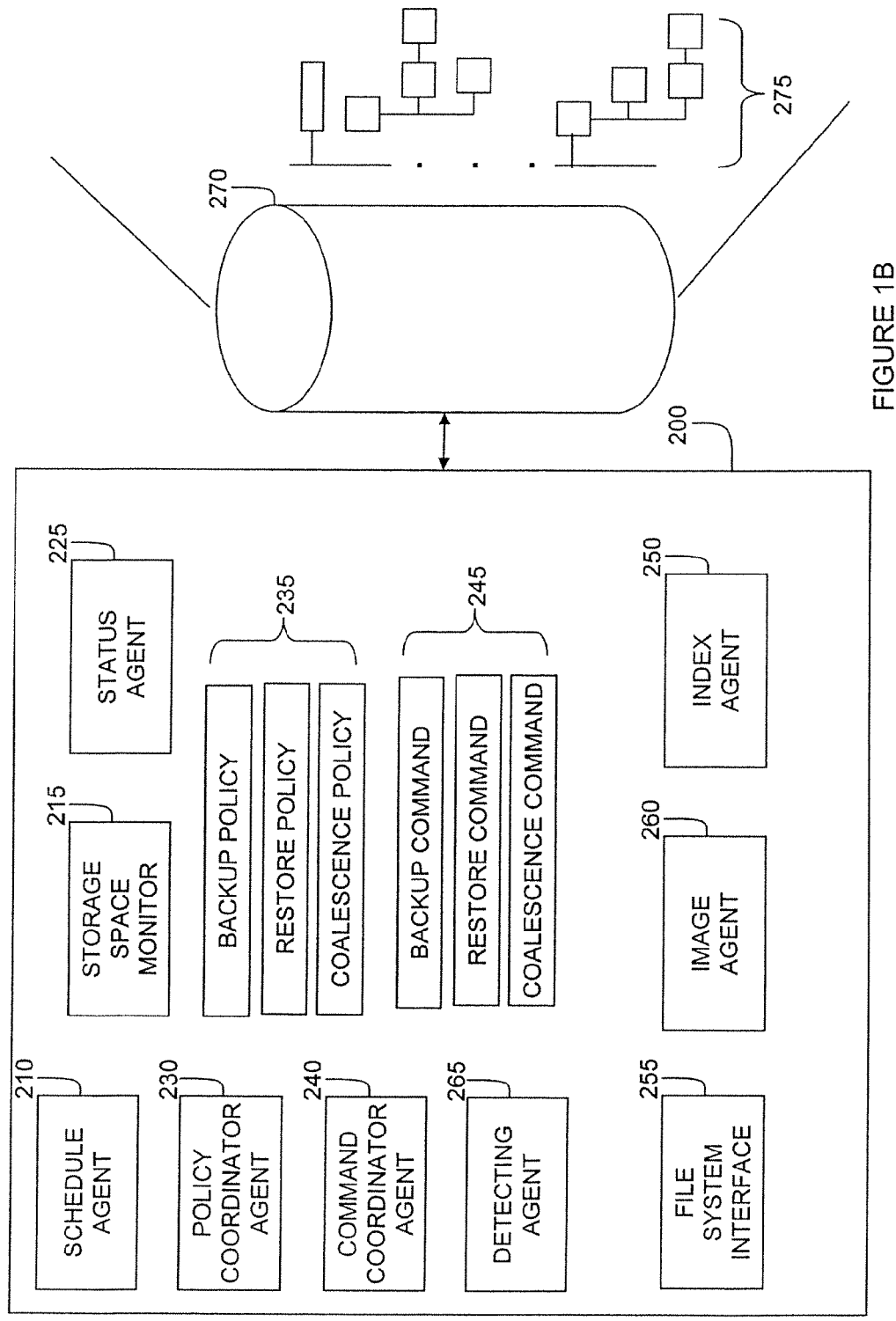
Figure 1C:
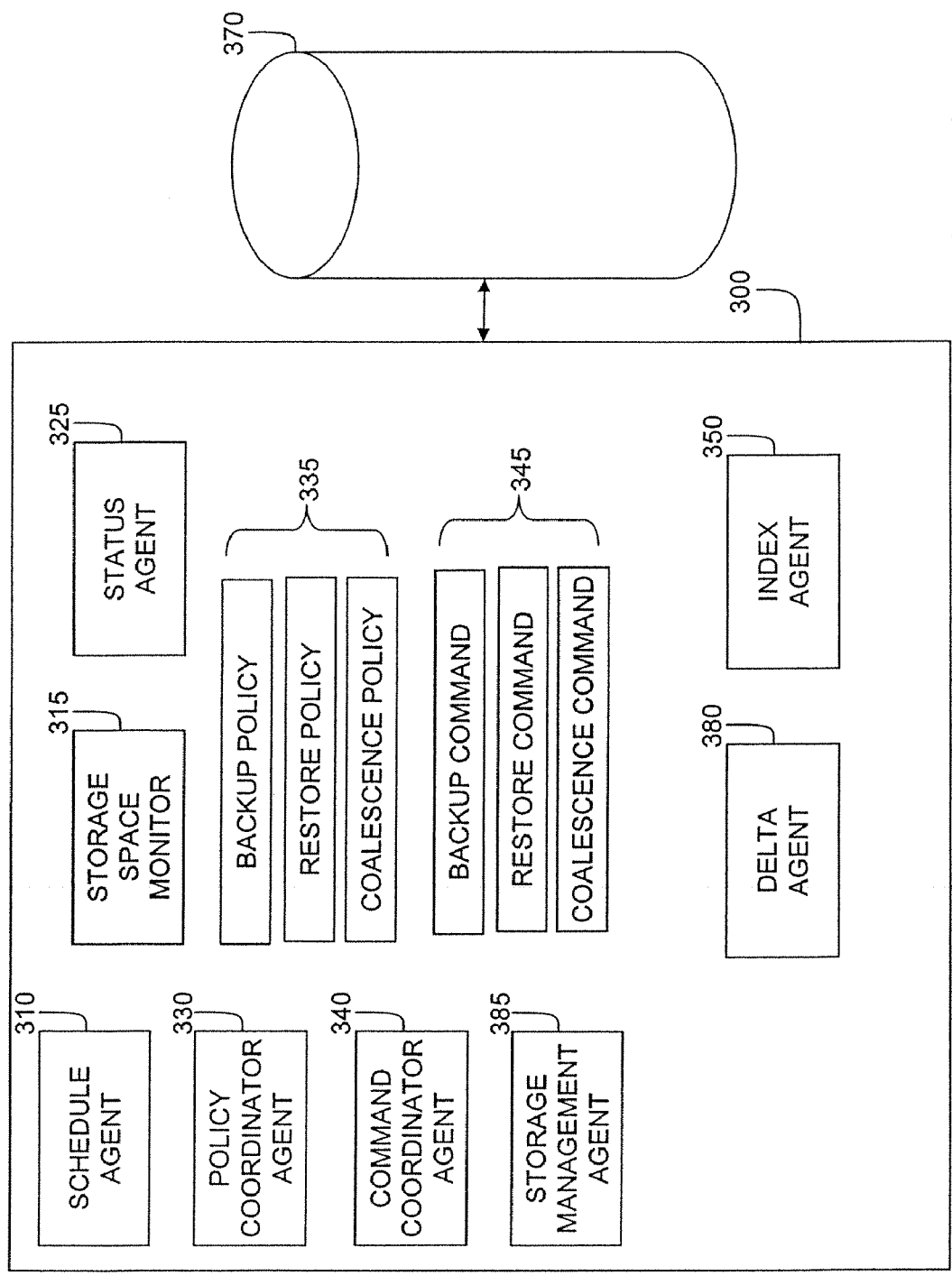

FIGS. 1A-1C schematically illustrate an exemplary system for backing up data files. As shown in the embodiment of FIG. 1A, the system 100 can include first and second client data processing devices ("clients") 110, 120, first and second data server data processing devices ("data servers") 130, 140, and first and second backup server digital data processing devices ("backup servers") 150, 160. The first and second data servers 130, 140 and the first and second backup servers 150, 160 can be associated with first and second data storage devices 135, 145 and first and second backup storage devices 155, 165, respectively. The data servers 130, 140 can provide the clients 110, 120 with access (e.g., read and/or write access) to data files stored on the data storage devices 135, 145, respectively, based on requests from the clients 110, 120. In some embodiments, the data servers 130, 140 can maintain different types of data files on the data storage devices 135, 145, respectively. For example, in one such embodiment, the data server 130 can maintain email files on the data storage device 135, and the data server 140 can maintain document files on the data storage device 145. The clients 110, 120 can open, close, modify, and/or delete the data files stored on the data storage devices 135, 145. The backup servers 150, 160 can backup changes in the data files stored on the data storage devices 135, 145 to the backup storage devices 155, 165. In some embodiments, the backup servers 150, 160 and the backup storage devices 155, 165 can be configured to store backed up data with different terms of data retention. For example, in one such embodiment, the first backup server 150 and the first backup storage device 155 can store data for a relatively short term, while the second backup server 160 and the second backup storage device 165 can store data for a relatively long term. In one such embodiment, the first backup storage device 155 can include one or more magnetic disks, and the second backup storage device 165 can include one or more magnetic tapes. The terms of data retention can be selected by a user (e.g., a system administrator or another entity).

As shown in FIG. 1A, the clients 110, 120, the servers 130, 140, 150, 160, and the storage devices 135, 145, 155, 165 can exchange data over a data communications network 105. The data communications network 105 can include one or more network nodes (e.g., the clients 110, 120, the data servers 130, 140, and the backup servers 150, 160) that can be interconnected by wired and/or wireless communication lines (e.g., public carrier lines, private lines, satellite lines, etc.) that enable the network nodes to communicate. The exchange of data (e.g., messages) between network nodes can be facilitated by network devices (e.g., routers, switches, multiplexers, bridges, and gateways, etc.) that can manipulate and/or route data from an originating node to a server node regardless of dissimilarities in the network topology (e.g., bus, star, or token ring), spatial distance (local, metropolitan, or wide area network), transmission technology (e.g., transfer control protocol/internet protocol (TCP/IP) or Systems Network Architecture), data type (e.g., data, voice, video, or multimedia), nature of connection (e.g., switched, non-switched, dial-up, dedicated, or virtual), and/or physical link (e.g., optical fiber, coaxial cable, twisted pair, or wireless, etc.) between the originating and server nodes. The nodes can include a networking subsystem (e.g., a network interface card) to establish a communications link between the nodes. The communications link interconnecting the nodes can include elements of a data communications network, a point to point connection, a bus, and/or another type of digital data path capable of conveying processor-readable data.

As will be understood by those of ordinary skill in the art, in some embodiments, one or more nodes of the data communications network 105 can be included in a local area network ("LAN"). For example with reference to FIG. 1A, in one such embodiment, the clients 110, 120, the data servers 130, 140, the first backup server 150, the data storage devices 135, 145, and the first backup storage device 155 can form or otherwise be included in a LAN. Such a LAN can include a publicly accessible or a private, i.e., non-publicly-accessible, LAN. In such an embodiment, the second backup server 160 and the second backup data storage device 165 can be located remotely from the LAN and can communicate with one or more nodes of the LAN based on schemes known to those of ordinary skill in the art. Alternatively, for example with reference to FIG. 1A, in some embodiments, the clients 110, 120, the data servers 130, 140, and the data storage devices 135, 145 can form or otherwise be included in a LAN, and the first and second backup servers 150, 160 and the associated backup storage devices 155, 165 can be located remotely from the LAN.

The described systems and methods are not limited to network-based systems, and can be implemented on stand-alone systems. For example, in some embodiments, the systems and methods described herein can be implemented on a stand-alone system that includes a digital data processing device and a data storage device. The digital data processing device can include features of data servers and backup servers as described herein, and the data storage device can include storage for data files and backed-up data.

The digital data processing devices 110, 120, 130, 140, 150, 160 can include a personal computer, a computer workstation (e.g., Sun, Hewlett-Packard), a laptop computer, a mainframe computer, a server computer, a network-attached storage (NAS) device, a handheld device (e.g., a personal digital assistant, a Pocket Personal Computer (PC), a cellular telephone, etc.), an information appliance, and/or another type of generic or special-purpose, processor-controlled device capable of receiving, processing, and/or transmitting digital data. As will be understood by those of ordinary skill in the art, a processor can refer to the logic circuitry that responds to and processes instructions that drive digital data processing devices and can include, without limitation, a central processing unit, an arithmetic logic unit, an application specific integrated circuit, a task engine, and/or combinations, arrangements, or multiples thereof.

As shown in FIG. 1A, the storage devices 135, 145, 155, 165 can store data files that can be maintained by the servers 130, 140, 150, 160, respectively. As used herein, the term data files can be understood to include files having types and formats of data known to those of ordinary skill in the art. For example, the term data files can include application files, data files, executable files, object files, program files, operating system files, registry files, and other types of data files known to those of ordinary skill in the art, with such examples provided for illustration and not limitation. In some embodiments, the term data files can be understood to include one or more portions of data files. For example, in some embodiments, the term data files can be understood to include data objects within data files, such as attachments (e.g., attachments to email files), records (e.g., records in an email file), and data rows and tables (e.g., data rows and tables in a structured query language (SQL) database file), with such examples being provided for illustration and not limitation. The storage devices 135, 145, 155, 165 can include, for example, volatile and/or non-volatile memory and/or storage elements, such as a random access memory (RAM), a hard drive (e.g., an internal or external hard drive), a magnetic disk, a magnetic tape, a compact disk (CD), a digital video disk (DVD), a redundant array of independent disks (RAID), a removable memory device. In some embodiments, the storage devices 135, 145, 155, 165 can include storage devices networked via a network storage topology known to those of ordinary skill in the art, such as, but not limited to, network-attached storage (NAS) and/or storage area networking (SAN) topologies. In some embodiments, such as the embodiment shown in FIG. 1A, the storage devices 135, 145, 155, 165 can be physically separate from the servers 130, 140, 150, 160, respectively. Alternatively and/or in combination, in some embodiments, one or more of the storage devices 135, 145, 155, 165 can be physically integrated into one or more respective servers 130, 140, 150, 160. For example, in one such embodiment, storage device 135 can be integrated into server 130. In some embodiments, one storage device can be associated with two or more servers.

FIG. 1B schematically illustrates features of an exemplary data server and an associated data storage device. As shown in FIG. 1B, the data server 200 can include a schedule agent 210, a storage space agent 215, a status agent 225, a policy coordinator agent 230 and one or more policies 235, a command coordinator agent 240 and one or more commands 245, an index agent 250, a file system interface 255, an image agent 260, and a detecting agent 265. As used herein, the term agent can refer to one or more software processes executing on the data server 200, and the term policy can refer to an operation (such as a backup operation, a restore operation, and a coalescence operation) to be performed by the agents of the data server 200. A policy can include data based on and/or otherwise associated with one or more data files (e.g., a list of the data files affected by the policy) and times of executing the policy. As further described herein, a policy can be generated by a user (e.g., a system administrator or another entity). Although the features of the data server 200 (and the features of the backup server 300 shown in FIG. 1C) are shown as performing different functions, those of ordinary skill in the art will understand that the features of the data server 200 (and, separately, the features of the backup server 300) can be combined or otherwise modified to form different features and should be interpreted in an illustrative and non-limiting manner.

As shown in the embodiment of FIG. 1B, the data server 200 can be associated with a data storage device 270 that can store one or more data files 275 in a format such as a directory and sub-directory structure, although other formats can be employed. The schedule agent 210 can provide messages including time data that can be used by the policy coordinator agent 230 and/or other agents to initiate one or more actions. For example, as described further herein, in one embodiment, the schedule agent 210 can provide a message to the policy coordinator agent 230 indicating that a time included in a policy 235 for performing an action has been reached. The storage space agent 215 can determine the quantity of available storage space on the data storage device 270. The status agent 225 can provide status information (e.g., error messages and/or informational messages) to one or more agents of the data server 200. The policy coordinator agent 230 can manage the policies 235 on the data server 200 and can specify an operation to be executed (e.g., a backup operation, a restore operation, and a coalescence operation). The command coordinator agent 240 can execute an operation specified by the policy coordinator agent 230. For example, the command coordinator agent 240 can generate commands 245 (e.g., backup, restore, and coalescence commands) for executing an operation specified by the policy coordinator 230. The index agent 250 can generate one or more indexes to locate backed-up data. For example, in one embodiment, the index agent 250 can generate two indexes for locating backed-up data based on the data files 275 stored on the data storage device 270. The file system interface 255 can provide an interface to the data files 275 stored on the data storage device 270. The image agent 260 can generate an image of one or more of the data files 275 stored on the data storage device 270. The detecting agent 265 can detect changed locations in one or more of the data files 275 stored on the data storage device 270 with respect to an image of the data files. As provided previously herein, the illustrated embodiments are merely exemplary, and accordingly, agents 210, 225, 230, 240, 250, 260, 265 can be combined, separated, and/or rearranged in different embodiments.

FIG. 1C schematically illustrates features of an exemplary backup server and an associated backup storage device. As shown in FIG. 1C, the backup server 300 can include one or more agents similar to those shown in FIG. 1B. These agents are denoted by reference numerals that differ by increments of 100 with respect to the reference numerals of the agents shown in FIG. 1B. Also, the backup server 300 can include a delta agent 380 and a storage management agent 385. The delta agent 380 can manage data stored on backup storage device 370, such as data associated with a backup of the data files stored on data storage device 270. The storage management agent 385 can provide input and output (e.g., asynchronous input and output) to the backup storage device 370.

As will be understood by those of ordinary skill in the art, the described systems and methods are not limited to a particular configuration of clients, data servers, backup servers, and storage devices, and can be implemented on systems different than those shown in FIGS. 1A-1C. For example, the described systems and methods can be implemented on configurations including one or more clients, one or more data servers, one or more data storage devices, one or more backup servers, and one or more backup storage devices. Those of ordinary skill in the art will also understand that the functions of one or more of the features of the data server 200 and backup server 300 can be distributed among two or more features. For example, the functions of the imaging agent 260 of the data server 200 can be distributed between agents residing on the data server 200 and the backup server 300. Also for example, the functions of the imaging agent 260 of the data server 200 can be distributed among two or more imaging agents associated with different groupings of the data files 275 stored on the data storage device 270.

Figure 2:
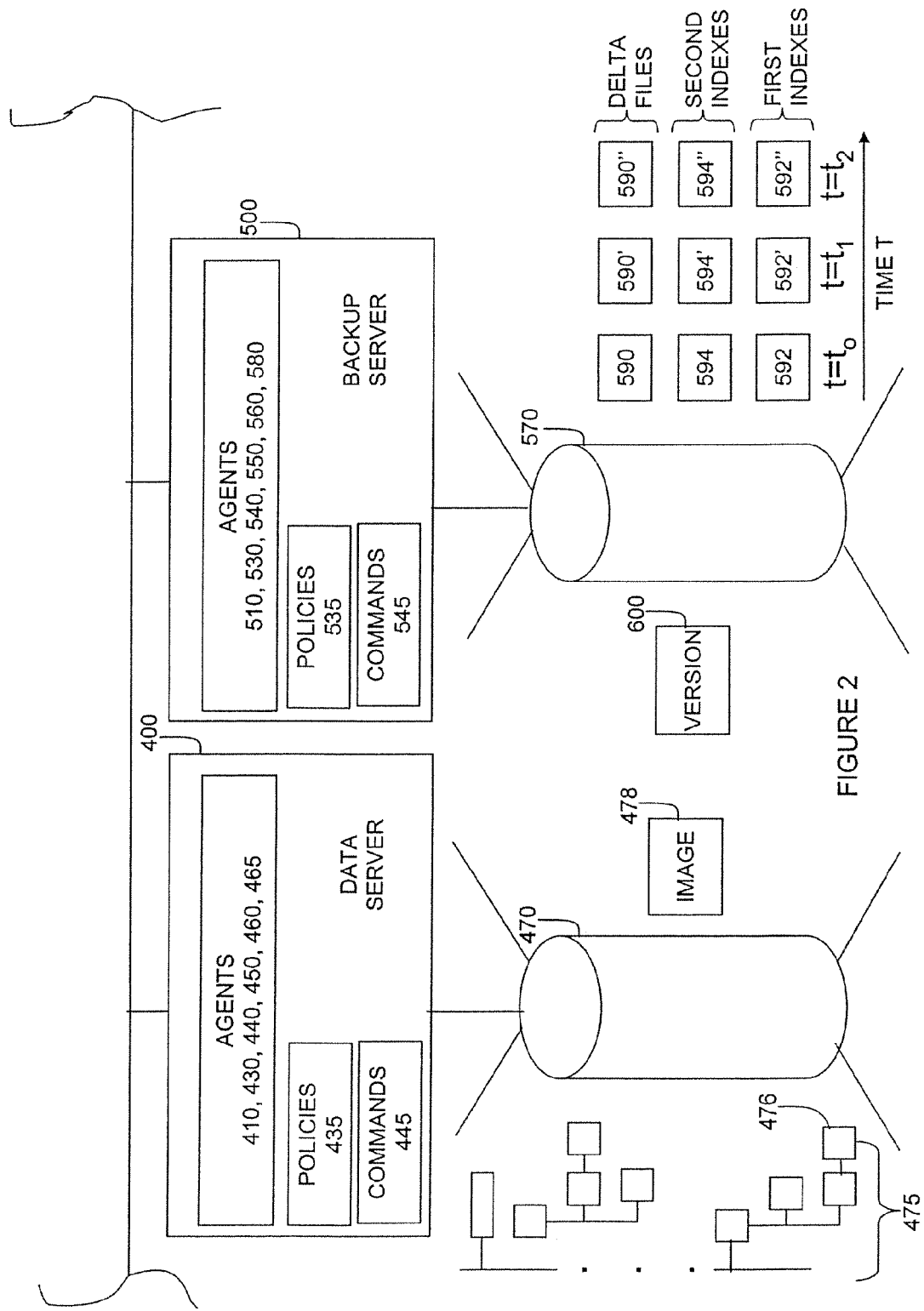
FIG. 2 schematically illustrates exemplary operations for a system according to FIGS. 1A-1C.

FIG. 2 schematically illustrates a portion of the exemplary system 100 shown in FIGS. 1A-1C. As shown in FIG. 2, the illustrated portion of the exemplary system 100 can include a data server 400 and an associated data storage device 470 and a backup server 500 and an associated backup storage device 570. The data server 400 and the backup server 500 can include features similar to those described herein with respect to FIGS. 1A-1C. Some of these features are denoted in FIG. 2 with reference numerals that differ by increments of 100 with respect to the reference numerals of FIGS. 1B and 1C. As will be understood by those of ordinary skill in the art, the data server 400 and the backup server 500 can exchange data based on a client/server model, in which the data server 400 can represent the client portion of the model and the backup server 500 can represent the server portion of the model.

Exemplary operations for a system according to FIGS. 1A-1C will now be described with reference to FIG. 2. The operations shown in FIG. 2 can be initiated by one or more agents residing on the data server 400 and/or one or more agents residing on the backup server 500. Those of ordinary skill in the art will understand that the exemplary operations should be interpreted in an illustrative and non-limiting manner.

An overview of an exemplary backup operation for a system according to FIGS. 1A-1C will now be provided with reference to FIG. 2. For purposes of illustration, the exemplary backup operation will be described with respect to initiation by agents residing on the data server 400. Based on a backup command 445 from a command coordinator agent 440, the imaging agent 460 can generate a byte-level image 478 of the data files 475 stored on the data storage device 470. As shown in FIG. 2, the data storage device 470 can store one or more data files 475 which can include a hierarchical structure, such as the illustrated directory and subdirectory structure. In some embodiments, the byte-level image 478 can be stored on the data storage device 470. Alternatively and/or in combination, in some embodiments, the byte-level image 478 can be stored on the backup storage device 570. Substantially contemporaneously with and/or subsequent to generation of the image 478, the detecting agent 465 can detect, on a byte level, changed locations in the data files 475 with respect to the image 478. The data server 400 (e.g., the command coordinator agent 440, the detecting agent 465, and/or another agent on the data server 400) can provide the changed locations to the backup server 500, and, at a storage time, such as the storage time $t_0$ shown in FIG. 2, the delta agent 580 can store the contents of the changed locations in a delta file 590 on the backup storage device 570. Alternatively and/or in combination, the backup server (e.g., the command coordinator agent 540, the delta agent 580, and/or another agent on the backup server 500) can retrieve the changed locations from the data server 400. Substantially contemporaneously with and/or subsequent to generation of the delta file 590, the index agent 450 and/or 550 can associate the stored contents in the delta file 590 with the storage time $t_0$, the changed locations, and one or more file identifiers identifying the data files 475 including the detected changed locations. For example, as shown in FIG. 2, the index agent 450 and/or 550 can generate a first index 592 to the changed locations based on the file identifiers and a second index 594 to the stored contents based on the changed locations. As shown in the embodiment of FIG. 2, the first and second indexes 592, 594, respectively, can be stored on the backup storage device 570. Alternatively and/or in combination, the first and second indexes 592, 594, respectively can be stored on the data storage device 470. The detecting agent 465 can iteratively return to detecting and/or continue to detect changed locations in the data files 475 with respect to the image 478, and the delta agent 580 can generate delta files 590', 590" at subsequent storage times, such as the times $t_1$, $t_2$ shown in FIG. 2. The index agent 450 and/or 550 can generate first and second indexes associated with the delta files, denoted as 592', 592" and 594', 594", respectively. As described further herein, the image 478, the delta files 590, and the associated first and second indexes 592, 594 can be used to create a version of a data file including changed locations at one or more of the storage times $t_0$, $t_1$, and $t_2$.

Data included in one or more of the delta files 590, first indexes 592, and second indexes 594 can be compressed and/or encrypted based on schemes known to those of ordinary skill in the art.

Some features of the exemplary backup operation shown in FIG. 2 will now be described. The backup operation can be initiated by a request to backup a data file stored on the data storage device 470. In some embodiments, a scheduling agent 410 and/or 510 can provide a message indicating that a time or an event (e.g., condition satisfied) included in a backup policy 435 and/or 535 has occurred. A backup policy 435 and/or 535 can include data based on data files for which to detect changed locations (which are referred to herein as "policy data files") and storage times at which to store the contents of the changed locations. The storage times can be based on times, such as actual times (e.g., times as measured by a clock on a server, such as the data server 400 and/or the backup server 500) and time intervals (e.g., periodic time intervals as measured by a clock on a server), and/or events (e.g., events specified by a system administrator or another entity). For purposes of illustration, the policy data files in FIG. 2 are designated as the data files 475 stored on the data storage device 470. Those of ordinary skill in the art will understand that the policy data files can include one or more of the data files 475 stored on data storage device 470. Those of ordinary skill in the art will also understand that the described systems and methods can be configured to concurrently execute multiple policies associated with different policy data files.

Based on a request to backup the policy data files 475 and/or a message from a scheduling agent 410 that a time or an event included in a backup policy 435 has occurred, a policy coordinator agent 430 can determine whether an image for the policy data files already exists, i.e., was previously generated. As used herein, the term image can be understood to include a copy of the policy data files 475 at a previous time. The policy coordinator agent 430 can determine whether the image of the policy data files exists based on schemes known to those of ordinary skill in the art. Based on determining that an image of the policy data files does not exist, the policy coordinator agent 430 can instruct the command coordinator agent 440 to generate an image of the policy data files 475, and the command coordinator agent 440 can instruct the image agent 460 to generate an image of the policy data files 475. For example, as shown in the embodiment of FIG. 2, the image agent 460 can generate an image 478 of the policy data files 475 and store the image 478 on the data storage device 470.

The image agent 460 can generate one or more different types of images. In some embodiments, the image agent 460 can generate a snapshot image 478 of the policy data files 475. As used herein, the term snapshot image 478 can be understood to include the contents of the policy data files 475 and their interrelationships, e.g., the directory and sub-directory structure shown in FIG. 2. Alternatively and/or in combination, in some embodiments, the image agent 460 can generate one or more file images (e.g., images of one or more of the policy data files 475) and/or one or more volume images, as the term volume images is understood by those of ordinary skill in the art. The image agent 460 can generate the image 478 in a transactional safe state of the policy data files 475. For example, prior to generation of the baseline image 478, the command coordinator agent 440 can instruct the data server 400 and/or the data storage device 470 to place the policy data files 475 into a transactional safe state. As will be understood by those of ordinary skill in the art, a transactional safe state refers to a state of a data file in which changes to a data file are prohibited at least temporarily. The transactional safe state of the policy data files 475 can be released after generation of the image 478.

In some embodiments, the command coordinator agent 440 can command the index agent 450 to use one or more data integrity procedures to generate a summary or digest of the image 478. The data integrity procedures can be based on one or more of a Cyclic Redundancy Check (CRC) algorithm, the MD5 message digest algorithm, and other digest algorithms known to those of ordinary skill in the art. The index agent 450 can associate the summary with the image 478 and can store the summary in the data storage device 470. In some embodiments, the index agent 450 can generate a summary of one or more portions of the image 478. For example, in one such embodiment, the index agent 450 can generate summaries of directories and/or subdirectories included in the image 478. Also for example, in one such embodiment, the index agent 450 can generate summaries of one or more of the policy data files 475 included in the image 478.

In the following discussion, references will be made to baseline images and summaries and second images and summaries. As used herein, the terms "baseline" and "second" can refer to a relative time relationship, in which baseline indicates association with an earlier time, and second indicates association with a later time.

Based on a baseline image 478 for the policy data files 475 being generated and/or otherwise identified, the policy coordinator agent 430 can instruct the command coordinator agent 440 to backup the policy data files 475, and the command coordinator agent 440 can instruct the detecting agent 465 to detect changed locations in the policy data files 475. In some embodiments, the detecting agent 465 can include a file system filter. As will be understood by those of ordinary skill in the art, a file system filter can include a driver that interacts with an operating system via a kernel interface and that can intercept and communicate requests (e.g., input/output request packets (IRPs)) from an operating system to a file system. Alternatively and/or in combination, in some embodiments, the detecting agent 465 can include a file scanning agent. In some embodiments, the detecting agent 465 can include a file system filter and a file scanning agent as part of a redundancy scheme. For example, the detecting agent 465 can detect changes by default with the file system filter and, based on a failure of the file system filter, with the file scanning agent. In some embodiments, the detecting agent 465 can detect changed locations on a byte-level and/or a disk block-level.

As will be understood by those of ordinary skill in the art, the described systems and methods are not limited to detecting agents 465 that include a file system filter and/or a file scanning agent and can include detecting agents 465 that are configured to detect changes and/or changed locations in data files 475 based on other schemes for accomplishing the same.

In embodiments in which the detecting agent includes a file system filter, the detecting agent can intercept requests (e.g., write requests) from an operating system of the data server 400 to the policy data files 475 stored on the data storage device 470. In one such embodiment, the detecting agent 465 can provide messages that describe changes to the policy data files 475. For example, the detecting agent 465 can provide messages including data based on changed locations in the policy data files 475. The data can include file identifiers identifying files having changed locations and the byte-level changed locations. The detecting agent 465 can provide the messages dynamically, i.e., substantially contemporaneously with the changes to the policy data files 475. In embodiments in which the detecting agent 465 includes a file system filter, therefore, the detecting agent 465 can provide the command coordinator agent 440 with file identifiers identifying one or more policy data files 475 having changed locations and the corresponding byte-level changed locations.

In embodiments in which the detecting agent 465 includes a file scanning agent, the detecting agent 465 can scan the policy data files 475 for changed locations based on commands from the command coordinator agent 440. In one such embodiment, the image agent 460 can generate a second image of the policy data files 475, the index agent 450 can generate a second summary of the second image, and the detecting agent 465 can use the second summary and the baseline summary to determine whether the policy data files 475 include changed locations. For example, the detecting agent 465 can compare the second summary with the baseline summary to determine whether one or more of the policy data files 475 includes changed locations. Generally, differences between the baseline summary and the second summary can indicate that one or more of the policy data files 475 includes changed locations. As will be understood by those of ordinary skill in the art, the detecting agent 465 can compare multiple second summaries with multiple corresponding baseline summaries to identify policy data files 475 including changed locations. For example, the detecting agent 465 can compare summaries in a descending hierarchical manner, such as directory summaries, subdirectory summaries, and data file summaries, to identify policy data files 475 including changed locations. Based on identifying one or more policy data files 475 including changed locations, the detecting agent 465 can compare the second images of the policy data files having the changed locations with the corresponding baseline images to identify the changed locations. In embodiments in which the detecting agent 465 includes a scanning agent, therefore, the detecting agent 465 can provide the command coordinator agent 440 with file identifiers identifying one or more policy data files 475 having changed locations and the corresponding byte-level changed locations.

At a storage time included in the backup policy 435 and/or 535, such as the storage time $t_0$ shown in FIG. 2, the data server 400 (e.g., the detecting agent 465, the command coordinator agent 440, and/or another agent on the data server 400) can provide to the backup server 500 (e.g., the command coordinator agent 540, the delta agent 580, and/or another agent on the backup server 500) the contents of the changed locations, and the delta agent 580 can store the contents in a delta file 590 on the backup storage device 570. Alternatively and/or in combination, the backup server 500 can retrieve from the data server 400 the contents of the changed locations. Generally, the contents of the changed locations detected by the detecting agent 465 can be copied from the policy data files 475 stored on the data storage device 470 to the delta file 590 stored on the backup storage device 570. The delta agent 580 can store the contents in a delta file 590 that can be uniquely associated with the storage time, i.e., in a memory location that is different than a memory location associated with a different storage time. As shown in FIG. 2, the index agent 450 and/or 550 can generate the first and second indexes 592, 594, respectively, substantially contemporaneously with and/or subsequent to the generation of the delta file 590.

In some embodiments, the command coordinator agent 440 and/or 540 can include summaries of the contents of the changed locations in the second indexes 594. For example, the command coordinator agent 440 and/or 540 can command the index agent 450 and/or 550 to generate summaries of the contents of the changed locations being stored in the delta file 590. The detecting agent 465 can use the summaries to detect subsequently changed locations in the policy data files 475 based on schemes described herein.

Substantially contemporaneously with and/or subsequent to the storage time $t_0$, the detecting agent 465 can iteratively return to detecting and/or continue to detect changed locations in the policy data files 475. As shown in FIG. 2, delta files 590 and associated first and second indexes 592, 594 can be generated at storage times $t_1$ and $t_2$ that are later than the storage time $t_0$ based on schemes described herein. As previously indicated, a delta file 590 can represent changed locations in the policy data files 475 at a storage time $t_i$ with respect to the baseline image 478.

Figure 3:
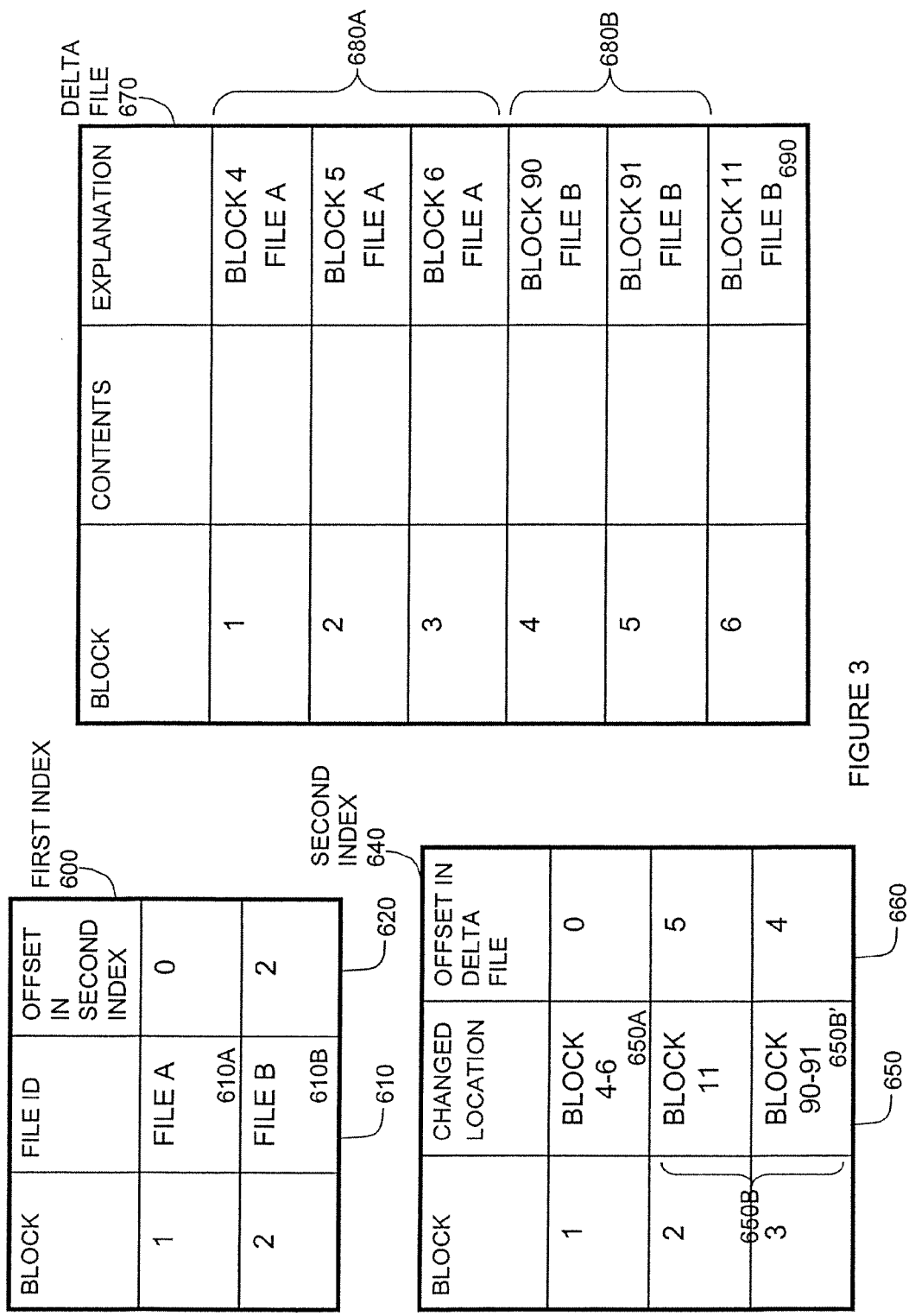
FIGS. 3 and 4 schematically illustrates exemplary delta files and indexes for a system according to FIGS. 1A-1C and 2; and, FIG. 5 schematically illustrates an exemplary display of a graphical user interface that can facilitate the described systems and methods.

FIG. 3 schematically illustrates features of exemplary delta files and indexes for a backup operation of a system according to FIGS. 1A-1C and 2. As shown in FIG. 3, a first index 600 can include data based on file identifiers 610 for policy data files including changed locations and locations 620, in a second index 640, of those changed locations. The locations 620 can be provided in the form of block offsets in the second index 640. As shown in FIG. 3, the second index 640 can include data based on the changed locations 650 and locations 660, in a delta file 670, of the contents of the changed locations. The locations 660 can be provided in the form of block offsets in the delta file 670. The delta file 670 can include contents 680 of the changed locations 650. For purposes of illustration, the delta file 670 includes an explanatory column 690 showing the changed locations 650 and file identifiers 610 associated with the contents 680.

In some embodiments, the changed locations 650 and the contents 680 can be grouped consecutively. As shown in the second index 640, the changed locations 650 can be grouped consecutively based on the file identifier associated with the changed locations 650. For example, the changed locations 650a associated with file A 610a can be grouped consecutively, and the changed locations 650b associated with file B 610b can be grouped consecutively. As shown in the delta file 670, the contents 680 can be grouped consecutively based on the changed locations 650 associated with the contents 680. For example, the contents 680a associated with the changed locations 650a can be grouped consecutively, and the contents 680b associated with the changed locations 650b' can be grouped consecutively. Although FIG. 3 shows that the changed locations 650 and the contents 680 can be stored consecutively, those of ordinary skill in the art will understand that the described systems and methods are not limited to consecutive storage of the changed locations 650 and/or the contents 680, and that non-consecutive storage schemes for the changed locations and/or the contents different than those described herein can be used.

An exemplary restore operation for a system according to FIGS. 1A-1C will now be described with reference to FIG. 2. For purposes of illustration, the exemplary restore operation will be described with respect to restoring a version of a policy data file 476 by agents residing on the backup server 500. Those of ordinary skill in the art will understand that the exemplary restore operation should be interpreted in an illustrative and non-limiting manner and that an operation similar to that described herein can be used to restore two or more policy data files.

The exemplary restore operation shown in FIG. 2 can be triggered by a request to restore a version of the policy data file 476. In some embodiments, a scheduling agent 410 and/or 510 can provide a message indicating that a time or an event included in a restore policy 435 and/or 535 has been reached. A restore policy 435 and/or 535 can include data based on versions of data files to restore and restore times at which to restore the versions. The restore times can be based on times, such as actual times and time intervals, and/or events.

Based on a request to restore a version of the data file 476 and/or a message from a scheduling agent 510, a policy coordinator agent 530 can instruct a command coordinator agent 540 to create the version 600 (e.g., open a new file for the version 600), write to the version 600 the baseline image 478 associated with the data file 476, and determine a delta file range and/or a storage time range for the version 600. As will be understood by those of ordinary skill in the art, the version 600 of the data file 476 can be associated with a version time, e.g., a past time. Based on the version time, the command coordinator agent 840 can determine the delta file range and/or the storage time range for the version 600. The storage time range can include storage times that are earlier than and/or substantially equal to the version time, and the delta file range can include delta files associated with times that are earlier than and/or substantially equal to the version time. For example with reference to FIG. 2, for a version time $t_1'$, where $t_2 < t_1' < t_1$, the storage time range can include the storage times $t_0$ and $t_1$ and the delta file range can include the delta files 590 and 590'.

Figure 4:
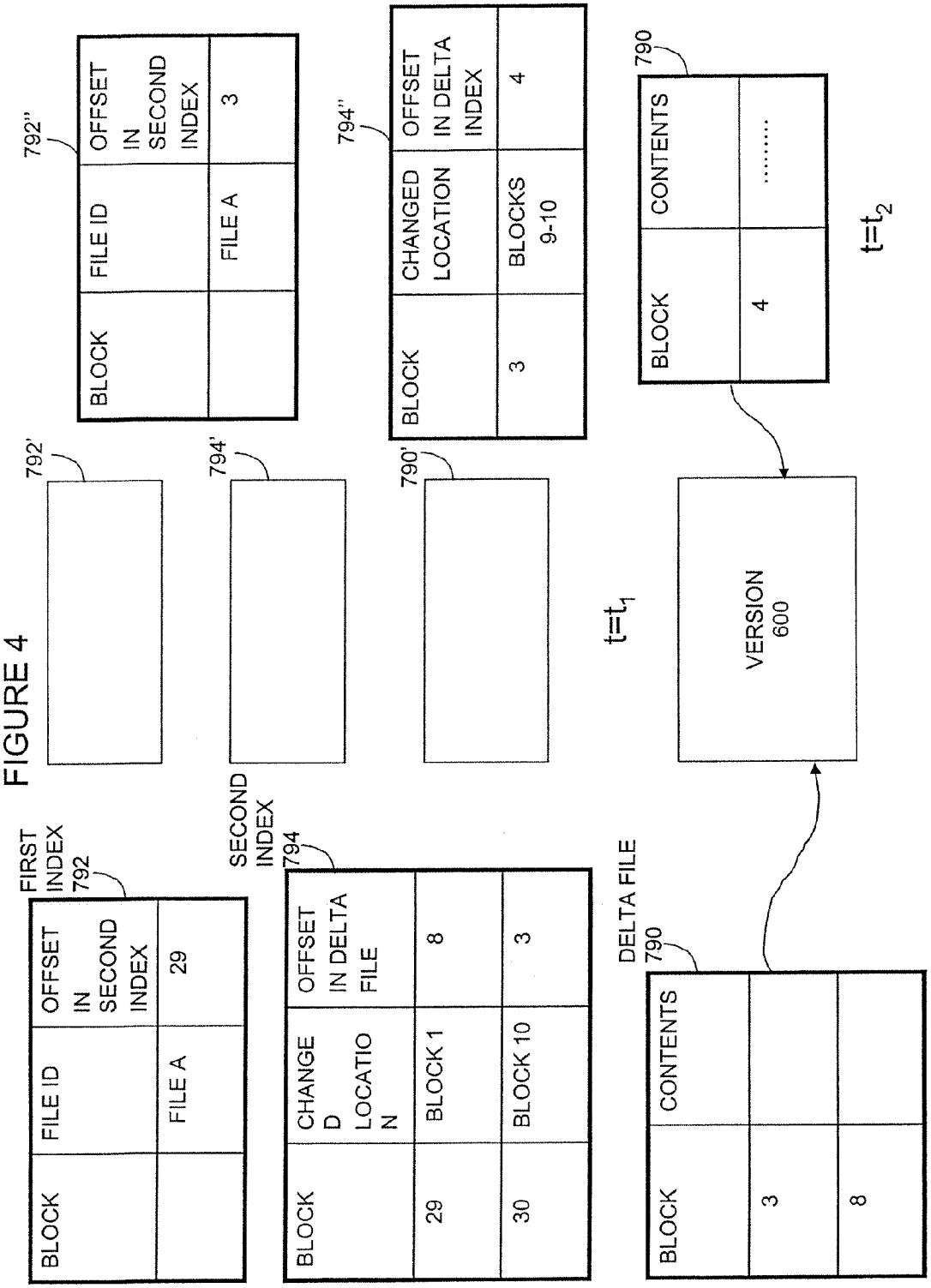

FIG. 4 shows exemplary delta files and indexes for a restore operation for a system according to FIGS. 1A-1C and 2. For purposes of illustration, the storage time range for the version 600 of the data file 476 to be restored includes the storage times $t_0$, $t_1$, and $t_2$, the delta file range includes the delta files 790, 790', and 790", and the file identifier for the data file 476 is "file A." The command coordinator agent 540 can query the first indexes associated with the delta file range for the version 600 (i.e., the first indexes 792, 792', 792") to determine whether one or more the first indexes includes the file identifier file A. Based on a first index including a file identifier file A, the command coordinator agent 540 can query the corresponding second index and delta file to identify the changed locations and the contents of the changed locations. As shown in FIG. 4, the first indexes 792 and 792" include file identifiers for file A, while the first index 792' does not include a file identifier for file A. The first indexes 792, 792" indicate that changes for file A were stored at storage times $t_0$ and $t_2$, while the first index 792' indicates that changes for file A were not stored at storage time $t_1$. Based on the second indexes 794, 794" and the delta files 790, 790" corresponding to the first indexes 792, 792", the command coordinator agent 540 can write to the version 600 the contents of the changed locations for file A. As shown in FIG. 4, the contents in delta files 790, 790" can be written to the version 600. The command coordinator agent 540 can combine the contents of the changed locations with the data from the baseline image previously included in the version 600 (e.g., the command coordinator can overwrite one or more portions of the baseline image with the contents of the changed locations). The backup server 500 (e.g., the command coordinator agent 540) can provide the recreated version 600 to the data server 400 (e.g., the command coordinator agent 440).

As previously described, in some embodiments, a version of a data file can be restored based on a backup server 500 (e.g., one or more agents residing on the backup server 500) writing backed-up data associated with the version of the data file to a version 600 and providing the recreated version 600 to a data server 400 (e.g., to one or more agents residing on the data server 400). Alternatively and/or in combination, in some embodiments, a version of a data file can be restored based on the backup server 500 providing the backed-up data associated with the version of the data file (e.g., backed-up data based on the delta files 590, first indexes 592, and/or second indexes 594 associated with the version of the data file) to the data server 400, and the data server 400 can use the image 478 and the backed-up data to recreate a version 600 of the data file. In such embodiments, the backup server 500 can provide the data server 400 with relevant portions of relevant delta files, first indexes, and second indexes for recreating a version of a data file, and the data server 400 can open the version and write to the version the relevant portions of the backed up data and the image 478. The data server 400 can combine the relevant portions of the backed up data and the image 478. For example, the data server 400 can overwrite portions of the image 478 with corresponding portions of more recent backed-up data.

A version of a data file can be restored to one or more memory locations on one or more servers. For example, in some embodiments, a restored version of a data file can be associated with the same memory location as an original version, and the original version can be moved to and/or otherwise associated with a different memory location. Alternatively and/or in combination, in some embodiments, a restored version of a data file can be associated with one or more different memory locations than an original version. For example, a restored version of a data file can be associated with a different directory than an original version. Also for example, a restored version of a data file can be restored to one or more different storage devices (e.g., different storage devices on a LAN). A restored version of a data file can be associated with a name based on schemes known to those of ordinary skill in the art.

In one embodiment of the disclosed methods and systems, a coalescing process as provided herein can be employed to simulate a tape rotation scheme where a coalesced file, for example, can be associated with a virtual "tape." The number of virtual tapes, and hence, associated tape file(s) (e.g., a file derived using coalescence) may vary based on a user selection, administrator configuration, etc., and can depend on, for example, storage capacity, back up time/interval, and other factors. In some embodiments, one or more user interfaces can be provided to provide a tape rotation experience to a user and/or system administrator via the virtual tapes and the associated tape file(s). Access to a file can thus be provided based on an associated tape identity.

In one example of a virtual tape embodiment, a user and/or system administrator can determine a time to generate a "tape" file, and thus determine a time for coalescence. In some embodiments, this manual determination of the time may override and/or be performed in addition to otherwise scheduled coalescing processes as provided herein. In some embodiments, a user and/or system administrator may be limited to the number of "tape" files, and thus, the creation of a new tape file may overwrite and/or otherwise cause to be inaccessible, the oldest and/or another designated tape file within the limited number of tape files. It can be understood that the aforementioned methods for providing a virtual tape scheme can be employed via one or more user interfaces that can allow the user/system administrator to perform the features as provided herein. For example, the user/system administrator can be provided an interface that may show virtual tape identifiers, associated file identifiers, file information (e.g., time of creation, user ID associated with the creation, storage location, coalescence information, etc.), to allow the user/system administrator to make selections and/or designations as provided herein.

With continuing reference to FIG. 2, in some embodiments, the command coordinator agent 540 can process delta files, first indexes, and/or second indexes in a time order. In one embodiment including a reverse time processing order, the command coordinator agent 540 can determine whether changed locations for a file identifier at two or more storage times are the same. For example, the command coordinator agent 540 can determine whether changed locations associated with a file identifier in two or more second indexes are the same. Based on the changed locations being the same, the command coordinator agent 540 can write to the version 600 the stored contents of the changed locations associated with the latest storage time, i.e., the stored contents in the delta file associated with the latest storage time. For example with reference to FIG. 4, the second indexes 792 and 792" indicate that block 10 of file A changed at storage time $t_0$ and, later, at storage time $t_2$. In some embodiments, the command coordinator agent 540 can write to the version 600 the contents of block 10 from delta file 790" and ignore the contents of block 10 from delta file 790. Those of ordinary skill in the art will understand that the described systems and methods are not limited to a processing time order of the delta files, first indexes, and second indexes, and that other processing orders and/or schemes can be used within the scope of the present disclosure.

As previously described herein, in some embodiments, a version of a data file can be restored based on identifying a delta file range associated with the version and querying delta files and first and second indexes associated with the delta file range to identify changed locations and contents of the changed locations for the version. In embodiments in which the detecting agent 465 includes a file system filter, the version can be restored based on the backup server 500 (e.g., one or more agents on the backup server 500) providing the relevant backed-up data for the version (e.g., the relevant portions of the relevant delta files and indexes for the delta file range and file identifier associated with the data file) to the data server 400 (e.g., one or more agents on the data server 400), and the data server 400 can combine the contents of the backed-up data with the changes detected by the detecting agent 465 at times later than the latest storage time associated with delta file range but earlier than and/or contemporaneous with the version time. For example, with reference to FIG. 2, for a version time $t_1'$ that occurs between two storage times, e.g., $t_2 < t_1' < t_1$, the detecting agent 465 can provide changed locations occurring subsequent to the storage time $t_1$ and earlier than and/or contemporaneous with the version time $t_1'$.

An exemplary coalescence operation for a system according to FIGS. 1A-1C will now be described with reference to FIG. 2. For purposes of illustration, the coalescence operation will be described with respect to initiation by agents residing on the backup server 500. Those of ordinary skill in the art will understand that the exemplary coalescence operation should be interpreted in an illustrative and non-limiting manner and that an operation similar to that described herein can be used to coalesce different types of backed up data, e.g., delta files, first indexes, and/or second indexes.

The exemplary coalescence operation shown in FIG. 2 can be triggered by a request to coalesce one or more portions of the backed up data stored on the backup storage device 570. In some embodiments, a scheduling agent 410 and/or 510 can provide a message indicating that a time or an event included in a coalescence policy 435 has been reached. A coalescence policy can identify backed up data to be coalesced and times at which to coalesce the backed up data. The coalescence times can be based on times, such as actual times and time intervals, and/or events. In some embodiments, the events can be based on available storage space. For example, a coalescence operation can be triggered based on an available storage space on the backup storage device 570 dropping below a threshold. Based on a request to coalesce and/or a message from the scheduling agent 510, the policy coordinator agent 530 can instruct the command coordinator agent 540 to coalesce one or more portions of the backed up data stored on the backup storage device 570.

In some embodiments, the command coordinator agent 540 can coalesce stored contents within a single delta file. As previously described, in some embodiments, the detecting agent 465 can include a file system filter that can detect changed locations as the changed locations happen, i.e., substantially contemporaneously with the changed locations. For example, the file system filter can detect changes in the same changed location of a data file at different times between storage times. A delta file can thus include multiple instances of stored contents corresponding to the same changed locations of the same data file. In some embodiments, the command coordinator agent 540 can coalesce, i.e., merge, stored contents in a single delta file that are associated with the same changed locations of a data file, so that the coalesced delta file includes one instance of a changed location of a data file. Also for example, a file system filter can detect portions of consecutive changed locations at different times between storage times. A delta file can thus store contents of consecutive changed locations in a data file at non-consecutive locations. In some embodiments, the command coordinator agent 540 can coalesce, i.e., concatenate, stored contents in a single delta file that are associated with consecutive changed locations for a data file, so that the stored contents in the coalesced delta file are stored consecutively. Based on coalescing the stored contents in the delta file, the command coordinator agent 540 can coalesce the corresponding first and second indexes to associate the coalesced contents in the coalesced delta file with the coalesced changed locations and the coalesced file identifiers.

Alternatively and/or in combination, in some embodiments, the command coordinator agent 540 can coalesce, i.e., merge, two or more delta files associated with different storage times to generate a coalesced delta file. As shown in FIG. 4, two or more delta files associated with different storage times can include stored contents associated with the same data files. For example, the delta files 790 and 790" associated with storage times $t_0$ and $t_2$, respectively, both include stored contents associated with file identifier A. A coalesced delta file based on two or more delta files that include the same changed locations for the same file identifier can include the stored contents associated with the latest storage time, i.e., the stored contents in the delta file associated with the latest storage time. For example with reference to FIG. 4, a coalesced delta file based on the delta files 790 and 790" can include the contents of block 10 for file A stored in delta file 790" (which is associated with the later storage time $t_2$) and not the contents of block 10 for file A stored in delta file 790 (which is associated with the earlier storage time $t_0$). Based on coalescing two or more delta files to generate a coalesced delta file, the command coordinator agent 540 can coalesce the corresponding first and second indexes to associate the coalesced delta file with the coalesced changed locations and the coalesced file identifiers.

As previously described, the command coordinator agent 540 can coalesce, i.e., merge, two or more delta files to generate a coalesced delta file based on opening a coalesced delta file, coalescing the delta files, and writing and/or otherwise providing the coalesced data to the coalesced delta file. In some embodiments, the command coordinator agent 540 can coalesce, i.e., merge, two or more delta files based on breaking the delta files into two or more portions and iteratively coalescing the portions. For example, in one such embodiment, the command coordinator agent 540 can separate, partition, and/or otherwise divide the delta files into portions, coalesce one of the portions, write and/or otherwise provide the coalesced portion to the coalesced file, delete the portion, and iteratively return to coalescing the remaining portions. Iteratively coalescing portions of the delta files can reduce data storage capacity for coalescence. In embodiments in which portions of delta files are iteratively coalesced, indexes corresponding to the coalesced delta files can be updated based on the status of the coalesced portions. For example, the indexes can be updated to refer to the locations of the portions of the delta files and, based on coalescing the portions, updated to refer to the coalesced delta file.

As previously described, in some embodiments, the backup servers 150, 160 of the exemplary system 100 shown in FIG. 1A can be configured to store backed up data with different terms of data retention. In such embodiments, the first backup server 150 can be configured to store data for a relatively short term, and the second backup server 160 can be configured to store data for a relatively long term. For example, the first backup server 150 can be configured to store data for one or more days, weeks, or months, and the second backup server 160 can be configured to store data for one or more years. In some embodiments, the first backup server 150 can backup the data files maintained by the data server 130 and/or 140 based on a backup period and can provide the backed up data to the second server 160 based on a data retention period that is greater than the backup period. Alternatively and/or in combination, in some embodiments, the first backup server 150 can coalesce the backed up data based on a coalescence period that is greater than the backup period and can provide the coalesced data to the second server 160. In one such embodiment, the backup period can be one day, the coalescence period can be one week, and the retention period can be one month. In such an embodiment, the first backup server 150 can maintain as many as three weekly-coalesced delta files and seven daily delta files associated with a backup policy, and the backup server 160 can maintain as many as fifty-two weekly-coalesced delta files associated with the same backup policy. Alternatively and/or in combination, in some embodiments, the second server 160 can coalesce the backed up data provided by the first data server 150.

As will be understood by those of ordinary skill in the art, the described systems and methods are not limited to using two backup servers 150, 160 that are associated with different terms of data retention. For example, in some embodiments, the backup servers 150, 160 can be configured to separately backup data files maintained by the first and second data servers 130, 140, respectively.

Using first and second indexes to associate stored contents with storage times, changed locations, and file identifiers can facilitate recreating versions of data files. As previously described with respect to FIG. 2, the backup server 500 (e.g., one or more agents residing on the backup server 500) can store delta files 590 and indexes 592, 594 on the backup storage device 570. In some embodiments, copies of the indexes 592, 594 can also be stored on the data storage device 470. In one such embodiment, the data server 400 can facilitate a request to recreate a version of a selected data file by using the indexes 592, 594 to determine a storage time range for the version. Based on the storage time range and the file identifier for the selected data file, the data server 400 can query the indexes 592, 594 to identify the changed locations for the selected data file and the locations of the corresponding stored contents in delta files associated with the indexes 592, 594. Based on processing the indexes 592, 594, the data server 400 can generate a request for the relevant portions of the relevant delta files from the backup server 500, and the backup server 500 can provide the relevant portions of the relevant delta files to the data server 400.

Using first and second indexes to associate stored contents with storage times, changed locations, and file identifiers can also facilitate recreating data files based on backed up data maintained by a relatively long-term data storage device. As previously described with respect to FIG. 1A, the first backup server 150 and the first backup storage device 155 can be configured to store data for a relatively short term, and the second backup server 160 and the second backup storage device 165 can be configured to store data for a relatively long term. In some embodiments, the first backup storage device 155 can be based on magnetic disk, and the second backup storage device 165 can be based on magnetic tape. Based on the schemes previously described, a requesting server (e.g., the data server 130, 140 and/or the first backup server 150) can generate a request for relevant portions of relevant delta files from the second backup server 160, and the second backup server 160 can provide the relevant portions of the relevant delta files to the requesting server.

In some embodiments, backup server 150, 160 can access both of the data storage devices 155, 165 associated with different terms of data retention. For example, in some embodiments, backup server 150 can be configured to access backup storage device 155 (e.g., relatively short term data storage) and backup storage device 165 (e.g., relatively long term data storage). Alternatively and/or in combination, in some embodiments, backup server 150 can access a single data storage device having a data storage capacity allocated between relatively short term data storage and relatively long term data storage.

The described restore and coalescence operations can provide backed up data to one or more servers. For example, in some embodiments, the restore and/or coalescence operation can transmit backed up data to one or more data servers (e.g., a data server from which a request to restore a data file originated) and/or one or more backup servers (e.g., a short term backup server and/or a long term backup server) connected to and/or otherwise in communications with one or more data communications networks.

As previously described herein, data associated with a version of a data file can be stored on one or more servers, such as one or more data servers 400 (e.g., in an image 478) and/or one or more backup servers 500 (e.g., in one or more delta files 590 and first and second indexes 592, 594). In some embodiments, the described systems and methods can restore a version of a data file based on a pre-determined spatial hierarchy. In one such spatial hierarchy, a request to restore a version of a data file can be fulfilled based on accessing storage devices in a local-to-remote order. As used herein, the term local can be interpreted to include nodes that are included in a LAN, and the term remote can be interpreted to nodes that are not included in the LAN. For example, based on receiving a request from a client to restore a version of a data file, a data server can first determine whether one or more images stored on local storage devices include data sufficient to recreate the version. Based on locally stored images not being sufficient to recreate the version, the data server can communicate the request to one or more other local servers (e.g., local backup servers capable of accessing relatively short-term backed up data) and then directly and/or indirectly to one or more remote servers (e.g., remote backup servers capable of accessing relatively long-term backed up data).

As previously described, a user can interact with the clients 110, 120, the data servers 130, 140, and/or the backup servers 150, 160 to determine and/or otherwise select one or more policies (e.g., backup policies, restore policies, and coalescence policies 235, 335, 435, 535 shown in FIGS. 1B, 1C, and 2), one or more data retention terms (e.g., data retention terms for the first and second backup servers 150, 160 shown in FIG. 1), and/or other parameters of interest. The user can include a system administrator and/or another entity.

A local user can interact with the clients 110, 120 by, for example, viewing a command line, using a graphical and/or other user interface, and entering commands via an input device, such as a mouse, a keyboard, a touch sensitive screen, a track ball, a keypad, etc. The user interface can be generated by a graphics subsystem of the client 110, 120, which renders the interface into an on- or off-screen surface (e.g., on a display device and/or in a video memory). Inputs from the local user can be received via an input/output (I/O) subsystem and routed to a processor via an internal bus (e.g., a system bus) for execution under the control of an operating system of the client 110, 120.

Similarly, a remote user can interact with the clients 110, 120 over the data communications network 105. The inputs from the remote user an be received and processed in whole or in part by a remote digital data processing device collocated with the remote user. Alternatively and/or in combination, the inputs can be transmitted back to and processed by a local client 110, 120 or to another digital data processing device via one or more networks using, for example, thin client technology. The user interface of the local client 110, 120 can also be reproduced, in whole or in part, at the remote digital data processing device collocated with the remote user by transmitting graphics information to the remote device and instructing the graphics subsystem of the remote device to render and display at least part of the interface to the remote user.

In one illustrative operation, a graphics subsystem of the client 110, 120 can render and display a graphical user interface (including, for example, one or more menus, windows, and/or other visual objects) on a display device associated with the client 110, 120 that can support the definition of one or more policies, one or more data retention terms, and/or other parameters of interest.

An illustrative display of a graphical user interface that can facilitate a definition of a backup policy will now be described. Those of ordinary skill in the art will understand that the display should be interpreted in an exemplary manner and that displays different than that described herein can be used within the scope of the present disclosure. For example, aspects, components, features, and/or modules of the illustrative display can be combined, separated, interchanged, and/or rearranged to generate other displays.

Figure 5:
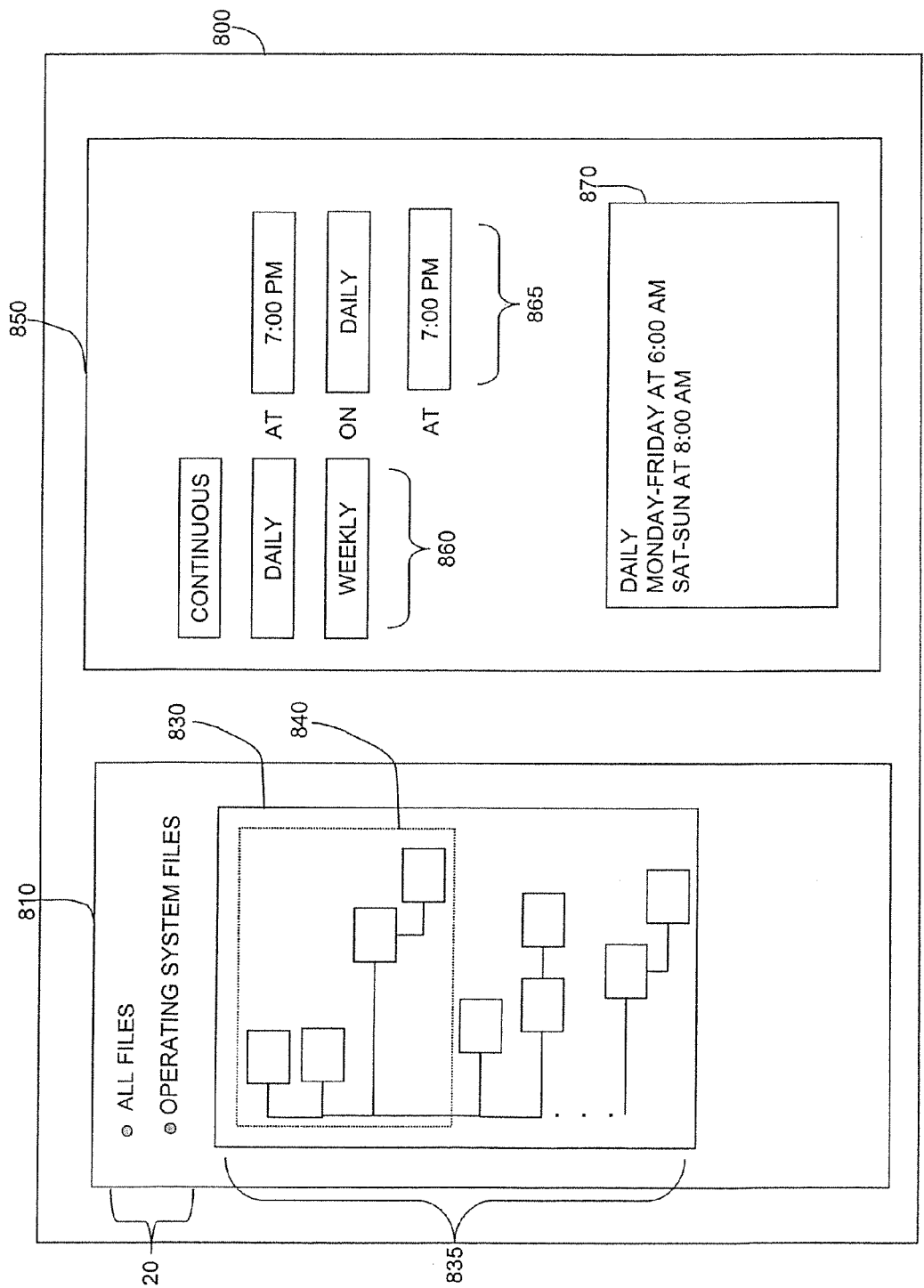

FIG. 5 shows an exemplary backup policy window 800 that can be used by a user (e.g., a system administrator and/or another entity) to determine a backup policy. As shown in FIG. 5A, the backup policy window 800 can include a data file selection region 810 and a storage time selection region 820.

The data file selection region 810 can include one or more features (e.g., pull-down menus, radio buttons, selectors, and/or fill-in boxes) for selecting files to be backed up. For example, as shown in FIG. 5, the data file selection region 810 can include radio buttons 820 for selecting files to be backed up, such as all data files or data files of a specific type (e.g., operating system files), and a display 830 of data based on the data files maintained by a data server, such as data server 130. The display 830 can present data based on the directories, subdirectories, and other file structures maintained by the data server 130 on data storage device 135. For example, as shown in FIG. 5, the display 830 presents a data structure 835 having data files arranged in a directory and subdirectory structure. A user may select one or more data files to be backed up by, for example, selecting the files with a mouse click, drawing a box around the files, etc. For example, data files included in the box 840 represent data files selected by a user for backup and association with a backup policy. Unselected files can be excluded from backup and/or can be associated with different backup policies.

The storage time selection region 850 can include one or more features (e.g., pull-down menus, radio buttons, selectors, and/or fill-in boxes) for determining the storage times for the data files selected in box 840. For example, as shown in FIG. 5, the storage time selection region 850 can provide selectors 860 and pull-down menus 865 associated with different storage times, such as continuous storage times (which can be understood to refer to backup of the data files 840 substantially contemporaneously with changed locations to the data files 840), periodic storage times (e.g., daily and weekly as shown in FIG. 5), and custom storage times 870 (e.g., daily on Monday-Friday at 6:00 AM and daily on Saturday-Sunday at 8:00 AM).

As will be understood by those of ordinary skill in the art, displays similar to those shown in FIG. 5 can be provided to allow a user to determine and/or otherwise select other parameters of interest, e.g., a restore policy, a coalescence policy, and a data retention term. For example, for a restore policy, a user can select one or more versions of one or more data files to be restored, one or more locations to which to restore the versions, and one or more times corresponding to the versions, i.e., past times; for a coalescence policy, a user can select a storage time range of delta files to be coalesced and/or a storage capacity threshold for initiating a coalescence; and, for a data retention term, a user can select a time interval for retaining backed up data.

The systems and methods described herein are not limited to a hardware or software configuration; they can find applicability in many computing or processing environments. The systems and methods can be implemented in hardware or software, or in a combination of hardware and software. The systems and methods can be implemented in one or more computer programs, in which a computer program can be understood to comprise one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted. The computer programs can be stored on a storage medium or a device (e.g., compact disk (CD), digital video disk (DVD), magnetic disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the methods described herein.

References to a network, unless provided otherwise, can include one or more intranets and/or the Internet. References herein to microprocessor instructions or microprocessor-executable instructions, in accordance with the above, can be understood to include programmable hardware.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

While the systems and methods described herein have been shown and described with reference to the shown embodiments, those of ordinary skill in the art will recognize or be able to ascertain many equivalents to the embodiments described herein by using no more than routine experimentation. Such equivalents are intended to be encompassed by the scope of the present disclosure and the appended claims. Accordingly, the systems and methods described herein are not to be limited to the embodiments described herein, can comprise practices other than those described, and are to be interpreted as broadly as allowed under prevailing law.

What is claimed is:

1. A method for maintaining, in a storage system having a source storage system and target storage system, information from which a set of source files stored on the source storage system can be retrieved, the method comprising
    storing baseline images of one or more source data files in target files of the target storage system, and
    for each of a sequence of target storage times:
    A) dynamically identifying locations in the source storage system where changes have been made since the previous target storage time; and
    B) in response to identifying the locations,
        i) reading at that target storage time contents that occupy the locations, and
        ii) sending the contents to the target storage system; and
    C) storing the contents in the target storage system together with associations of the contents with the locations.

2. The method of claim 1, wherein the associations of the contents with the locations associate the contents with the files in the source storage system to which those contents were written.

3. The method of claim 2, further comprising providing in the target storage system associations between the contents there stored and the target storage times for which those contents were stored.

4. The method of claim 3, wherein the target sstorage times are based on one or more of: an actual time, a time interval, and an event.

5. The method of claim 3, wherein providing the associations includes:
    generating one or more indexes to associate: the stored contents, the respective target storage times, the respective changed locations, and one or more respective file identifiers.

6. The method of claim 5, wherein the one or more indexes include:
    a first index to the changed locations based on the one or more file identifiers, and
    a second index to the stored contents based on the changed locations.

7. The method of claim 3, further comprising:
    receiving from a first server a request to create a version of a selected one of the one or more source data files, and based on the request:
    for each of one or more target storage times associated with the version: querying one or more indexes that associate the stored contents, the respective target storage times, the respective changed locations, and one or more respective file identifiers, to identify stored contents and respective changed locations associated with the selected data file, and
    providing the identified stored contents and respective changed locations to the first server.

8. The method of claim 7, further comprising:
    at the first server, combining the identified stored contents with data from a baseline image associated with the selected data file.

9. The method of claim 3, further comprising:
    at a coalescence time, coalescing:
    two or more stored contents associated with the same file and two or more different target storage times,
    the respective changed locations associated with the two or more coalesced contents, and
    one or more indexes to associate the coalesced contents, the respective coalesced changed locations, an identifier of the file with which those contents are associated, and the latest of the two or more different target storage times.

10. The method of claim 3, further comprising:
    at a coalescence time, coalescing:
    two or more stored contents associated with the same file and the same target storage time,
    the respective changed locations associated with the two or more coalesced contents, and
    one or more indexes to associate the coalesced contents, the respective coalesced changed locations, an identifier of the file with which those contents are associated, and the same target storage time.

11. The method of claim 10, wherein the coalescence time is based on one or more of: an actual time, a time interval, and an event.

12. The method of claim 11, wherein the event includes an event based on an available storage capacity of a storage medium.

13. The method of claim 1, wherein dynamically identifying the locations further comprises:
    at a time prior to that target storage time,
        storing a baseline image of at least the one or more source data files, and
        using one or more data integrity procedures to generate a baseline summary comprising a summary of the baseline image; and
    thereafter,
        storing a second image of at least the one or more source data files, using one or more data integrity procedures to generate a second image summary comprising a summary of the second image, and based on the baseline summary and the second image summary, determining whether the one or more source data files includes changed locations.

14. The method of claim 1, further comprising generating the baseline image, wherein the generating further comprises generating one or more of a volume image, a file image, and a snapshot image.

15. The method of claim 1, wherein storing the contents includes:
selecting at least one memory to store the contents.

16. The method of claim 15, wherein selecting at least one memory includes:
selecting the at least one memory to be distinct from a previously selected memory associated with a prior target storage time.

17. The method of claim 1, further comprising:
using the stored contents to create a version of a selected one of the one or more source data files.

18. The method of claim 17, wherein using the stored contents to create a version includes:
for each of one or more target storage times associated with the version: querying one or more indexes that associate the stored contents, the respective target storage times, the respective changed locations, and one or more respective file identifiers, to identify stored contents and respective changed locations associated with the selected data file, and
combining the identified stored contents with data from a baseline image associated with the selected data file.

19. The method of claim 18, wherein querying includes:
determining that the changed locations are the same for two or more different target storage times, and,
identifying the stored contents of the changed locations associated with the latest of the two or more different target storage times.

20. A storage medium containing instructions readable by a computer system that comprises a source storage system and a target storage system, the instructions comprising
instructions to configure the computer system to maintain in the target storage system information from which a set of source files stored on the source storage system can be retrieved, and
instructions to configure the computer system to store baseline images of one or more source data files in target files of the target storage system, and
instructions to configure the computer system for each of a sequence of target storage times to:
A) dynamically identify locations in the source storage system where changes have been made since the previous target storage time; and
B) in response to identifying the locations,
  i) read at that target storage time contents that occupy the locations, and
  ii) send the contents to the target storage system; and
C) store the contents in the target storage system together with associations of the contents with the locations.

21. The storage medium of claim 20, wherein the associations of the contents with the locations associate the contents with the files in the source storage system to which those contents were written.

22. The storage medium of claim 21, wherein the instructions further configure the computer system to provide in the target storage system associations between the contents there stored and the target storage times for which those contents were stored.

23. The storage medium of claim 22, wherein the target storage times are based on one or more of: an actual time, a time interval, and an event.

24. The storage medium of claim 22, wherein the instructions to provide the associations include instructions to generate one or more indexes to associate: the stored contents, the respective target storage times, the respective changed locations, and one or more respective file identifiers.

25. The storage medium of claim 24, wherein the one or more indexes include:
a first index to the changed locations based on the one or more file identifiers, and
a second index to the stored contents based on the changed locations.

26. The storage medium of claim 20, wherein the instructions to dynamically identify locations further comprises:
instructions at a time prior to that target storage time to:
  store a baseline image of at least the one or more source data files, and
  use one or more data integrity procedures to generate a baseline summary comprising a summary of the baseline image; and
thereafter,
  store a second image of at least the one or more source data files,
  use one or more data integrity procedures to generate a second image summary comprising a summary of the second image, and
  based on the baseline summary and the second image summary, determine whether the one or more source data files includes changed locations.

27. The storage medium of claim 20, wherein the instructions to store the contents include instructions to select at least one memory to store the contents.

28. The storage medium of claim 27, wherein the instructions to select at least one memory include instructions to select the at least one memory to be distinct from a previously selected memory associated with a prior target storage time.

29. The storage medium of claim 20, further comprising instructions to use the stored contents to create a version of a selected one of the one or more source data files.

30. The storage medium of claim 29, wherein the instructions to use the stored contents to create a version include instructions to:
for each of one or more target storage times associated with the version: query one or more indexes that associate the stored contents, the respective target storage times, the respective changed locations, and one or more respective file identifiers, to identify stored contents and respective changed locations associated with the selected data file, and
combine the identified stored contents with data from a baseline image associated with the selected data file.

31. The storage medium of claim 20, further comprising instructions to receive from a first server a request to create a version of a selected one of the one or more source data files, and
based on the request:
for each of one or more target storage times associated with the version: query one or more indexes that associate the stored contents, the respective target storage times, the respective changed locations, and one or more respective file identifiers, to identify stored contents and respective changed locations associated with the selected data file, and provide the identified stored contents and respective changed locations to the first server.

32. The storage medium of claim 31, further comprising instructions to, at the first server, combine the identified stored contents with data from a baseline image associated with the selected data file.

33. A computer system comprising a source storage system and a target storage system in which information is maintained from which a set of source files stored on the source storage system can be retrieved, the system being configured to execute agents that perform operations comprising:

storing baseline images of one or more source data files in target files of the target storage system, and for each of a sequence of target storage times:
  A) dynamically identifying locations in the source storage system where changes have been made since the previous target storage time; and
  B) in response to identifying the locations,
    i) reading at that target storage time contents that occupy the locations, and
    ii) sending the contents to the target storage system; and
  C) storing the contents in the target storage system together with associations of the contents with the locations.

34. The system of claim 33, wherein the associations of the contents with the locations associate the contents with the files in the source storage system to which those contents were written.

35. The system of claim 34, wherein at least one of the agents provides in the target storage system associations between the contents there stored and the target storage times for which those contents were stored.

36. The system of claim 35, wherein the target storage times are based on one or more of: an actual time, a time interval, and an event.

37. The system of claim 35, wherein at least one of the agents provides the associations by generating one or more indexes to associate: the stored contents, the respective target storage times, the respective changed locations, and one or more respective file identifiers.

38. The system of claim 37, wherein the one or more indexes include:

a first index to the changed locations based on the one or more file identifiers, and a second index to the stored contents based on the changed locations.

39. The system of claim 35, further configured to use the stored contents to create a version of a selected one of the one or more source data files.

40. The system of claim 39, wherein the system is configured to use the stored contents to create a version by:

for each of one or more target storage times associated with the version: querying one or more indexes that associate the stored contents, the respective target storage times, the respective changed locations, and one or more respective file identifiers, to identify stored contents and respective changed locations associated with the selected data file, and combine the identified stored contents with data from a baseline image associated with the selected data file.

41. The system of claim 35, further configured to receive from a first server a request to create a version of a selected one of the one or more source data files, and based on the request:

for each of one or more target storage times associated with the version: query one or more indexes that associate the stored contents, the respective target storage times, the respective changed locations, and one or more respective file identifiers, to identify stored contents and respective changed locations associated with the selected source data file, and provide the identified stored contents and respective changed locations to the first server.

42. The system of claim 41, further configured to, at the first server, combine the identified stored contents with data from a baseline image associated with the selected source data file.

43. The system of claim 33, wherein dynamically identifying locations further comprises:

at a time prior to the target storage time,
  storing a baseline image of at least the one or more source data files, and
  using one or more data integrity procedures to generate a baseline summary comprising a summary of the baseline image; and
thereafter,
  storing a second image of at least the one or more source data files,
  using one or more data integrity procedures to generate a second image summary comprising a summary of the second image, and
  based on the baseline summary and the second image summary, determining whether the one or more source data files includes changed locations.

44. The system of claim 33, wherein at least one of the agents selects at least one memory to store the contents.

45. The system of claim 44, wherein the at least one memory is distinct from a previously selected memory associated with a prior target storage time.

46. A method for maintaining, in a storage system having a source storage system and a backup storage system, information from which a set of source files stored on the source storage system can be retrieved, the method comprising storing baseline images of one or more source data files in backup files of the backup storage system, and for a selected backup storage time:
  A) dynamically identifying locations in the source storage system where changes have been made since a previous backup storage time; and
  B) in response to identifying the locations,
    i) reading contents that occupy the locations, and
    ii) sending the contents to the backup storage system; and
  C) storing the contents in the backup storage system together with associations of the contents with the locations.

47. A computer system comprising a source storage system and a backup storage system in which information is maintained from which a set of source files stored on the source storage system can be retrieved, the system being configured to execute agents that perform operations comprising:

storing baseline images of one or more source data files in backup files of the backup storage system, and for a selected backup storage time:
  A) dynamically identifying locations in the source storage system where changes have been made since a previous backup storage time; and
  B) in response to identifying the locations,
    i) reading contents that occupy the locations, and
    ii) sending the contents to the backup storage system; and C) storing the contents in the backup storage system together with associations of the contents with the locations.

48. A storage medium containing instructions readable by a computer system that comprises a source storage system and a backup storage system, the instructions comprising
  instructions to configure the computer system to maintain in the backup storage system information from which a set of source files stored on the source storage system can be retrieved, and
  instructions to configure the computer system to store baseline images of one or more source data files in backup files of the backup storage system, and
  instructions to configure the computer system for a selected backup storage time to:
  A) dynamically identify locations in the source storage system where changes have been made since a previous backup storage time; and
  B) in response to identifying the locations,
    i) read contents that occupy the locations, and
    ii) send the contents to the backup storage system; and
  C) store the contents in the backup storage system together with associations of the contents with the locations.

49. A method for maintaining, in a storage system having a source storage system and a target storage system, information from which a set of source files stored on the source storage system can be retrieved, the method comprising
  storing baseline images of one or more source data files in target files of the target storage system, and
  for a selected target storage time:
  A) dynamically identifying locations in the source storage system where changes have been made since a previous target storage time; and
  B) in response to identifying the locations,
    i) reading contents that occupy the locations, and
    ii) sending the contents to the target storage system; and
  C) storing the contents in the target storage system together with associations of the contents with the locations.

50. A computer system comprising a source storage system and a target storage system in which information is maintained from which a set of source files stored on the source storage system can be retrieved, the system being configured to execute agents that perform operations comprising:
  storing baseline images of one or more source data files in target files of the target storage system, and
  for a selected target storage time:
  A) dynamically identifying locations in the source storage system where changes have been made since a previous target storage time; and
  B) in response to identifying the locations,
    i) reading contents that occupy the locations, and
    ii) sending the contents to the target storage system; and
  C) storing the contents in the target storage system together with associations of the contents with the locations.

51. A storage medium containing instructions readable by a computer system that comprises a source storage system and a target storage system, the instructions comprising
  instructions to configure the computer system to maintain in the target storage system information from which a set of source files stored on the source storage system can be retrieved, and
  instructions to configure the computer system to store baseline images of one or more source data files in target files of the target storage system, and
  instructions to configure the computer system for a selected target storage time to:
  A) dynamically identify locations in the source storage system where changes have been made since a previous target storage time; and
  B) in response to identifying the locations,
    i) read contents that occupy the locations, and
    ii) send the contents to the target storage system; and
  C) store the contents in the target storage system together with associations of the contents with the locations.

* * * * *